United States Patent
Yukitake et al.

(10) Patent No.: US 8,714,041 B2
(45) Date of Patent: May 6, 2014

(54) TRANSMISSION

(75) Inventors: Yasuhiro Yukitake, Kitakaturagi-gun (JP); Akiyoshi Tashiro, Yamatotakada (JP); Hiroki Kagawa, Kashiba (JP); Takafumi Uemoto, Kashiwara (JP)

(73) Assignee: JTEKT Corporation, Osaka-Shi (JP)

( * ) Notice: Subject to any disclaimer, the term of this patent is extended or adjusted under 35 U.S.C. 154(b) by 233 days.

(21) Appl. No.: 13/390,235

(22) PCT Filed: Aug. 31, 2010

(86) PCT No.: PCT/JP2010/064796
§ 371 (c)(1),
(2), (4) Date: Feb. 13, 2012

(87) PCT Pub. No.: WO2011/027744
PCT Pub. Date: Mar. 10, 2011

(65) Prior Publication Data
US 2012/0144942 A1      Jun. 14, 2012

(30) Foreign Application Priority Data

Sep. 1, 2009   (JP) ................................. 2009-201832
Mar. 24, 2010   (JP) ................................. 2010-068017

(51) Int. Cl.
*F16H 59/00*   (2006.01)
*B60K 17/04*   (2006.01)

(52) U.S. Cl.
USPC ........................................................ 74/335

(58) Field of Classification Search
USPC ................ 74/335, 333, 337, 342, 330, 473.1, 74/473.12, 473.19, 473.37, 89.14, 89.11, 74/89.17, 665 A, 665 B, 665 D, 665 F, 74/665 G, 665 S
See application file for complete search history.

(56) References Cited

U.S. PATENT DOCUMENTS

| | | | |
|---|---|---|---|
| 5,121,655 A * | 6/1992 | Toshimitsu | 74/665 B |
| 5,626,055 A * | 5/1997 | Fukui | 74/116 |
| 5,689,997 A | 11/1997 | Schaller | |
| 5,901,608 A | 5/1999 | Takeyama | |

(Continued)

FOREIGN PATENT DOCUMENTS

| | | |
|---|---|---|
| DE | 195 27 893 C1 | 10/1996 |
| DE | 199 33 499 A1 | 1/2000 |

(Continued)

OTHER PUBLICATIONS

International Search Report dated Oct. 12, 2010 in International Application No. PCT/JP2010/064796.

*Primary Examiner* — Troy Chambers
*Assistant Examiner* — Jude Agendia
(74) *Attorney, Agent, or Firm* — Oliff PLC

(57) ABSTRACT

A transmission that is able to perform shift operation and select operation using the driving force of a single electric motor is provided. A shift/select actuating device includes: an electric motor; a first conversion mechanism; a second conversion mechanism; and a changing unit that changes a destination, to which the rotational driving force of the electric motor is transmitted, between the first conversion mechanism and the second conversion mechanism. The changing unit includes: a first electromagnetic clutch that transmits the rotational driving force of the electric motor to the first conversion mechanism or interrupts the rotational driving force; and a second electromagnetic clutch that transmits the rotational driving force to the second conversion mechanism or interrupts the rotational driving force.

9 Claims, 9 Drawing Sheets

(56) References Cited

U.S. PATENT DOCUMENTS

| | | | |
|---|---|---|---|
| 6,230,577 B1* | 5/2001 | Showalter et al. | 74/337.5 |
| 6,422,104 B2* | 7/2002 | Kamiya | 74/335 |
| 6,427,548 B1* | 8/2002 | Leimbach et al. | 74/331 |
| 7,080,568 B2* | 7/2006 | Itoh et al. | 74/335 |
| 7,231,844 B2* | 6/2007 | Yasui et al. | 74/335 |
| 7,350,433 B2* | 4/2008 | Yasui et al. | 74/335 |
| 2002/0152824 A1* | 10/2002 | Bansbach et al. | 74/335 |
| 2010/0107811 A1* | 5/2010 | McCloy | 74/665 F |

FOREIGN PATENT DOCUMENTS

| | | |
|---|---|---|
| EP | 0 757 193 A1 | 2/1997 |
| EP | 0 843 112 A2 | 5/1998 |
| JP | U-3-12623 | 2/1991 |
| JP | A-9-112688 | 5/1997 |
| JP | A-10-148256 | 6/1998 |
| JP | A-2000-35127 | 2/2000 |
| JP | A-2002-139146 | 5/2002 |
| JP | A-2003-314687 | 11/2003 |
| WO | WO 2005/057051 A1 | 6/2005 |

\* cited by examiner

TRANSMISSION

TECHNICAL FIELD

The invention relates to a transmission that performs shift operation and select operation using the diving force of an electric motor.

BACKGROUND ART

Conventionally, there is known a transmission formed of an automated manual transmission in which the clutch of a manual transmission is automated.

In this transmission, as in the case of a transmission formed of a manual transmission (M/T), a plurality of shift gears of a main shaft and a plurality of shift gears of a counter shaft all rotate while being constantly meshed. Each shift gear of the counter shaft is connected to the counter shaft at idle. A sleeve, which is associated in a one-to-one correspondence with each shift gear, is inserted to a desired shift gear to thereby couple that shift gear to the counter shaft so as to be integrally rotatable. Each sleeve is engaged with any one of a plurality of shift forks, and the shift fork is driven to change between insertion and non-insertion of a corresponding one of the sleeves. In addition, a select mechanism that selects the shift fork, which is a target to be driven, from among the plurality of shift forks is provided.

For example, as described in Patent Document 1, in a transmission of this type, shift forks are driven by the driving force of an electric actuator, typically, such as an air cylinder. Various transmitting members are interposed between the electric actuator and the shift forks so that driving force from the electric actuator is transmittable to the shift forks, and shift operation for driving the shift forks is performed by the driving force of the electric actuator.

In addition, further another electric actuator is provided for the transmission. Various transmitting members are interposed between the electric actuator and the select mechanism such that driving force from the electric actuator is transmittable to the select mechanism, and select operation for selecting the shift fork, which is a target to be driven, is performed by the driving force of the electric actuator.

In addition, Patent Document 2 describes the technique that employs electric motors instead of electric actuators as electric driving members. In this configuration, shift operation is performed by the rotational driving force of a first electric motor, and select operation is performed by the rotational driving force of a second electric motor.

RELATED ART DOCUMENT

Patent Document

Patent Document 1: Japanese Patent Application Publication No. 2003-314687
Patent Document 2: Japanese Patent Application Publication No. 2002-139146

SUMMARY OF THE INVENTION

Problems to be Solved by the Invention

However, in Patent Document 2, it is necessary to provide an electric motor for shift operation in addition to an electric motor for shift operation, so there is the possibility of an increase in cost.

Then, one of objects of the invention is to provide a transmission that is able to perform shift operation and select operation using the driving force of a single electric motor.

Means for Solving the Problems

A transmission according to one aspect of the invention includes: an electric motor that has a rotary shaft; a first output shaft that is rotatably provided coaxially with the rotary shaft of the electric motor; a first electromagnetic clutch that transmits rotational driving force from the rotary shaft to the first output shaft or interrupts the rotational driving force; a second output shaft that is rotatably provided coaxially with the rotary shaft; and a second electromagnetic clutch that transmits rotational driving force from the rotary shaft to the second output shaft or interrupts the rotational driving force, wherein the rotational driving force of the electric motor, given to the first output shaft, is used to perform shift operation for driving any one of shift forks, and the rotational driving force of the electric motor, given to the second output shaft, is used to perform select operation for selecting the any one of the shift forks, which is a target to be driven.

With this configuration, as the electric motor is driven, the drive shaft rotates. At this time, when the first and second electromagnetic clutches are in a non-operating state, the rotational driving force of the electric motor is not given to the first or second output shaft. Then, as the first electromagnetic clutch is operated, the rotational driving force of the electric motor is given to the first output shaft, and shift operation is performed by the rotational driving force of the first output shaft. In addition, as the second electromagnetic clutch is operated, the rotational driving force of the electric motor is given to the second output shaft, and select operation is performed by the rotational driving force of the second output shaft. Thus, by selectively operating the first or second electromagnetic clutch, it is possible to separately perform shift operation and select operation. By so doing, it is possible to perform shift operation and select operation using the rotational driving force of the single electric motor.

EMBODIMENTS OF THE INVENTION

Figure 1:
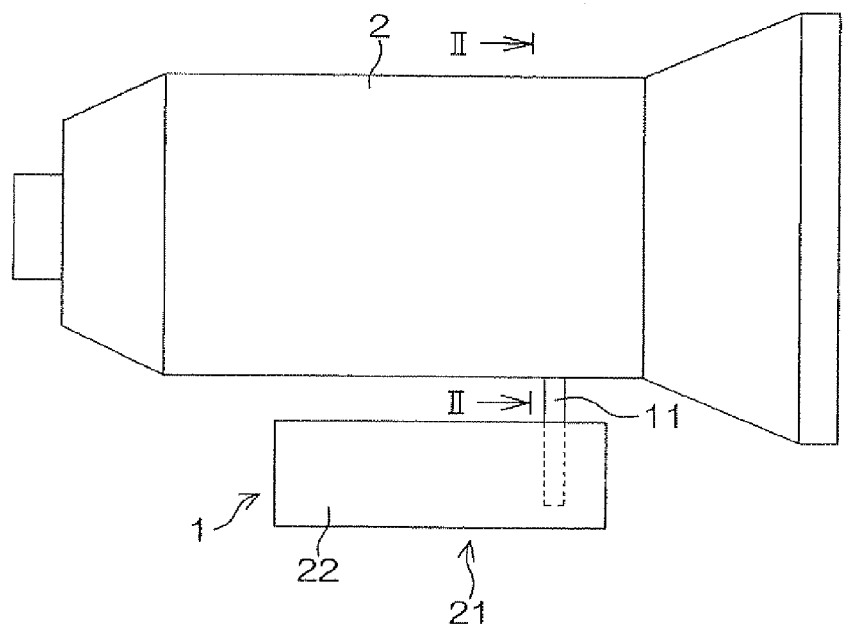
FIG. 1 is a view that shows the schematic configuration of a transmission according to a first embodiment of the invention.
Figure 2:
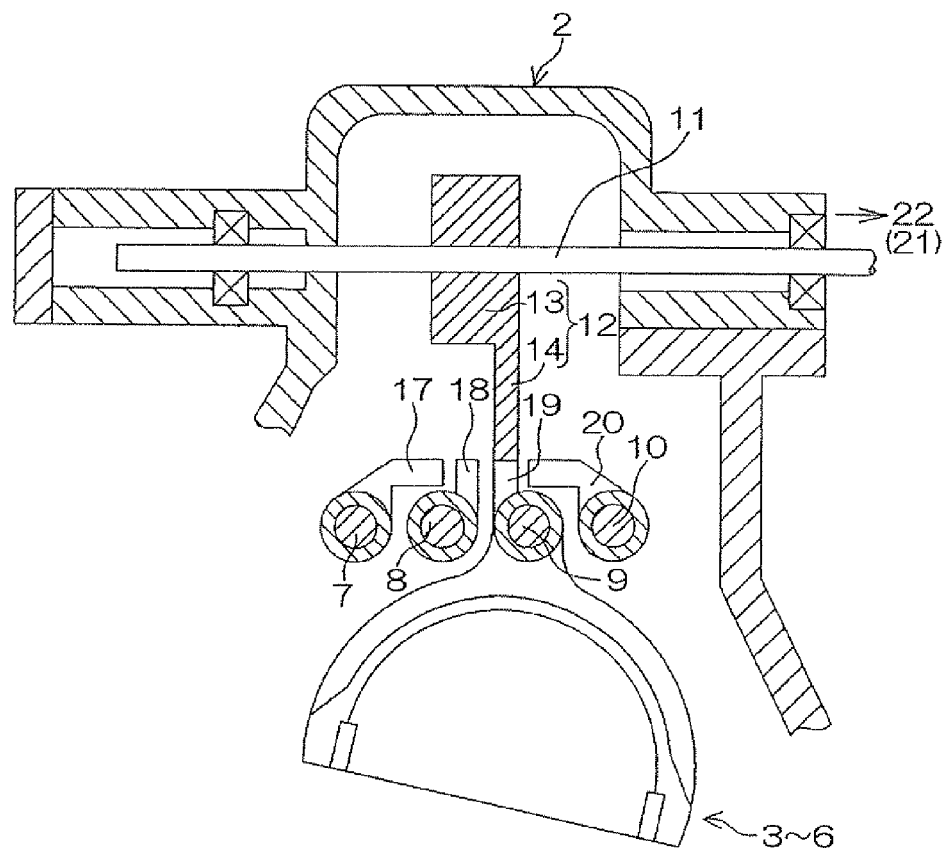
FIG. 2 is a sectional view that is taken along the sectional line II-II in FIG 1.

Hereinafter, embodiments of the invention will be specifically described with reference to the drawings. FIG. 1 is a view that shows the schematic configuration of a transmission 1 according to one embodiment (first embodiment) of the invention. FIG. 2 is a sectional view that is taken along the sectional line II-II in FIG. 1. The transmission 1 is mounted on a vehicle, such as a passenger automobile and a truck, and includes a gear box 2. In the gear box 2, a main shaft (not shown) that serves as an input shaft that receives input rotation from an engine, or the like, via a clutch (not shown) and a counter shaft (not shown) that serves as an output shaft that extends parallel to the main shaft and that transmits output rotation to a propeller shaft, or the like, are provided. A plurality of shift gears (not shown) are provided at the middle portion of each shaft. A constant mesh type is employed in this transmission 1, and the shift gears of the main shaft and the shift gears of the counter shaft all rotate while being constantly meshed. The shift gears are connected to the counter shaft at idle.

In addition, a sleeve (not shown), which is provided for the counter shaft in correspondence with each shift gear, is moved in the axial direction of the counter shaft to change between the coupled state and idle state of a corresponding one of the shift gears. The sleeve corresponding to a desired shift gear is engaged with one of shift forks 3, 4, 5 and 6 (see FIG. 2, and only one shift fork is shown in FIG. 1) and is driven by the one of the shift forks 3 to 6. Hereinafter, the configuration around the shift forks 3 to 6 in the gear box 2 will be specifically described with reference to FIG. 2.

In FIG. 2, the shift forks 3 to 6 are respectively fixed to fork shafts 7 to 10 that are in a one-to-one correspondence with the shift forks 3 to 6. The fork shafts 7 to 10 are provided at predetermined intervals so as to be movable in the axial direction and parallel to one another. A shift select shaft 11 extends in a direction perpendicular to the fork shafts 7 to 10 around (above in FIG. 2) the fork shafts 7 to 10. The shift select shaft 11 is rotatable about its axis and is movable in its axial longitudinal direction. A shift lever 12 is fixed to the middle portion of the shift select shaft 11. The shift lever 12 is selectively engageable with each of the fork shafts 7 to 10, and the shift lever 12 may be engaged with one of the fork shafts 7 to 10 by the rotation of the shift select shaft 11. Specifically, the shift lever 12 includes a boss portion 13 that is fixed to the shift select shaft 11 and a protruding portion 14 that protrudes from the lower end of the boss portion 13. Holding portions 17, 18, 19 and 20 that are able to hold the protruding portion 14 are provided for the respective fork shafts 7 to 10 so as to protrude side by side in the longitudinal direction of the shift select shaft 11. Then, the protruding portion 14 is held by any one of the holding portions 17 to 20 to achieve engagement between the shift lever 12 and a corresponding one of the fork shafts 7 to 10.

As the shift select shaft 11 is rotated about its axis, the shift lever 12 engages with a predetermined one of the fork shafts 7, 8, 9 and 10 to thereby cause a corresponding one of the shift forks 3 to 6 to drive the corresponding sleeve. In addition, as the shift select shaft 11 is moved in the axial longitudinal direction, the shift lever 12 also moves in that axial longitudinal direction to change a destination with which each of the fork shafts 7 to 10 is engaged. By so doing, the shift forks 3 to 6 to be driven are changed. That is, shift operation for driving any one of the shift forks 3 to 6 is performed by the rotation of the shift select shaft 11 about its axis, and, in addition, select operation for selecting any one of the shift forks 3 to 6, which is a target to be driven, is performed by the movement of the shift select shaft 11 in the axial direction.

Note that this embodiment is described by taking an example of the four fork shafts 7 to 10; instead, the number of fork shafts may be two, three, five or more. A shift/select actuating device 21 for actuating shift operation and select operation in the gear box 2 is mounted on the peripheral surface (outer surface) of the gear box 2. One end side (lower side in FIG. 1, and right end side in FIG. 2) portion of the shift select shaft 11 protrudes outward from the gear box 2 and enters a housing 22 of the shift/select actuating device 21.

Figure 3:
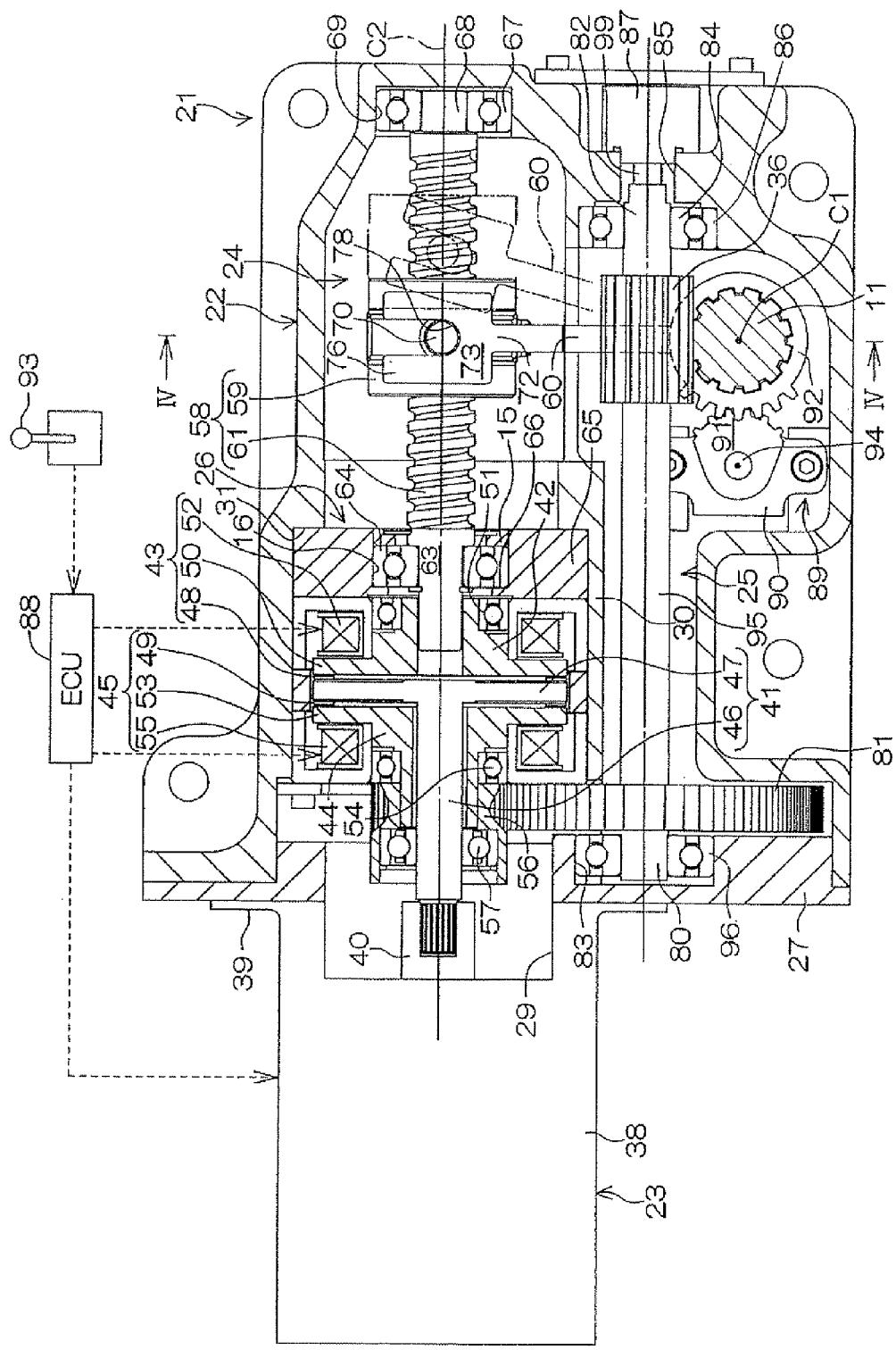
FIG. 3 is a sectional view that shows the configuration of a shift/select actuating device shown in FIG. 1.
Figure 4:
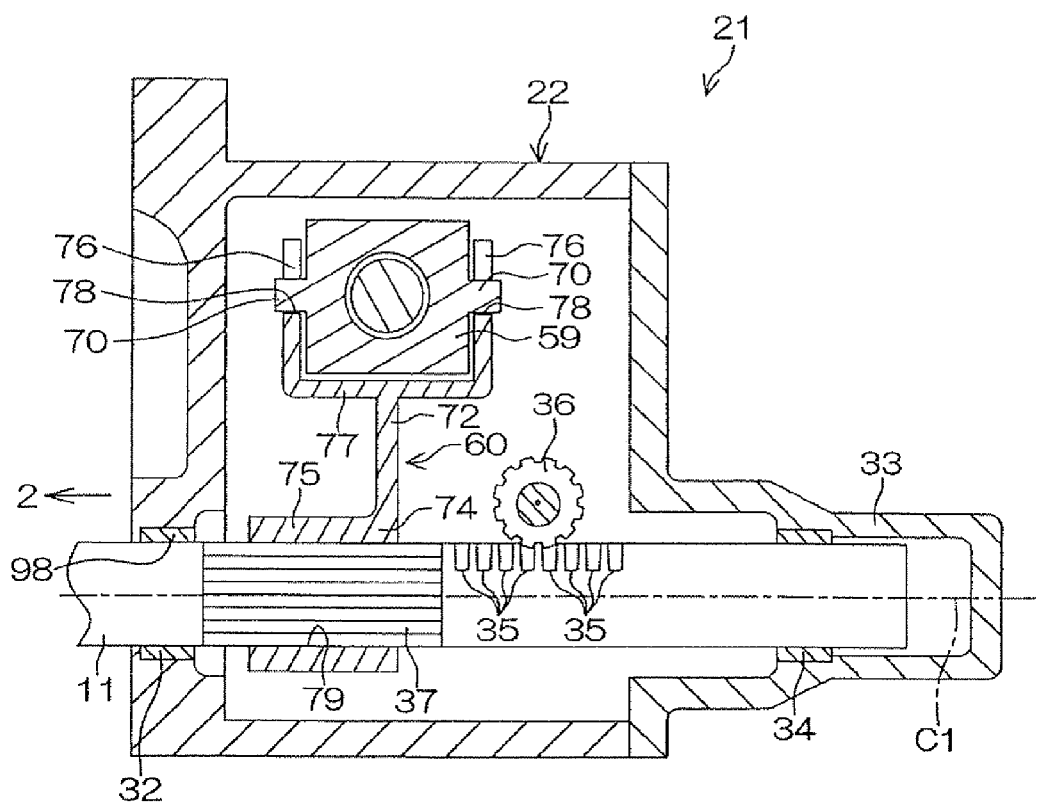
FIG. 4 is a sectional view that is taken along the sectional line IV-IV in FIG. 3.

FIG. 3 is a sectional view that shows the configuration of the shift/select actuating device 21. FIG. 4 is a sectional view that is taken along the sectional line IV-IV in FIG. 3. The shift/select actuating device 21 includes an electric motor 23, a first conversion mechanism 24 for amplifying the rotational driving force of the electric motor 23 and converting the amplified rotational driving force to force that rotates the shift select shaft 11 about its central axis C1, a second conversion mechanism 25 for amplifying the rotational driving force of the electric motor 23 and converting the amplified rotational driving force to force that moves the shift select shaft 11 in its axial longitudinal direction (horizontal direction in FIG. 3), and a changing unit 26 that changes a destination, to which the rotational driving force of the electric motor 23 is transmitted, between the first conversion mechanism 24 and the second conversion mechanism 25. That is, the shift/select actuating device 21 constitutes an electric actuator unit, and is applied to the transmission 1 as described in this embodiment to function as the shift/select actuating device.

The housing 22 has a closed-end cylindrical shape, and the opening (left side shown in FIG. 3) of the housing 22 is closed by a plate-like lid 27. The housing 22 and the lid 27 are formed using a material, such as cast iron and aluminum, and the outer periphery of the lid 27 is fitted to the opening of the housing 22. A circular through hole 29 is formed in the lid 27, and extends through from its inner surface (right surface shown in FIG. 3) to its outer surface (left surface shown in FIG. 3).

The changing unit 26 is accommodated in a cylindrical accommodating space 30 provided for the housing 22. A step 31 for receiving the changing unit 26 is formed at one end portion (right end portion shown in FIG. 3) of the inner peripheral surface of the accommodating space 30. In a state where the changing unit 26 is accommodated at a predetermined accommodating position in the accommodating space 30, one end (right end portion shown in FIG. 3) of the changing unit 26 is engaged with the step 31.

The shift select shaft 11 is supported in the housing 22 so as to be linearly reciprocally movable in its axial direction (direction perpendicular to the sheet surface shown in FIG. 3, and horizontal direction shown in FIG. 4) and rotatable. Specifically, the shift select shaft 11 is supported by a first plain bearing 32 (see FIG. 4) that is internally fitted to the through hole 98 (see FIG. 4) formed in the housing 22 and a second plain bearing 34 (see FIG. 4) that is internally fitted to the inner periphery of a swelled portion 33 (see FIG. 4) that is swelled so as to be able to accommodate the shift select shaft 11 in the housing 22.

A plurality of rack teeth 35 (see FIG. 4) are formed in the axial direction on the peripheral surface of the shift select shaft 11. Each of the rack teeth 35 is provided relatively long in the circumferential direction so that engagement between the rack teeth 35 and a pinion 36 (see FIG. 4) is kept even when the shift select shaft 11 rotates by a small amount. A spline portion 37 is formed on the peripheral surface of the shift select shaft 11 at a predetermined position adjacent to the gear box 2 with respect to the rack teeth 35.

For example, a brushless motor is employed as the electric motor 23. The electric motor 23 is arranged outside the housing 22. The electric motor 23 includes a cup-shaped motor housing 38, and a rotor (not shown) and a stator (not shown) that are accommodated in the motor housing 38. A motor driver (not shown) is provided for the electric motor 23, and the electric motor 23 is driven for rotation by the motor driver.

An annular flange portion 39 is formed at the proximal end portion (right end portion shown in FIG. 3) of the peripheral wall of the motor housing 38, and projects radially outward from the peripheral wall. The flange portion 39 is fixed to the outer surface (left surface shown in FIG. 3) of the lid 27. A rotary shaft 40 coaxially fixed to the rotor of the electric motor 23 extends along one direction (horizontal direction shown in FIG. 3) perpendicular to the shift select shaft 11, and its distal end portion protrudes outward from the motor housing 38 (C2 shown in FIG. 3 denotes the rotation axis of the rotary shaft 40).

The changing unit 26 includes a drive shaft 41 that is coupled to the rotary shaft 40 of the electric motor 23 via a coupling mechanism, such as spline coupling, so as to be integrally rotatable, a first output shaft 42 that is rotatably arranged coaxially on one side in the axial direction (right side shown in FIG. 3) of the drive shaft 41, an annular first electromagnetic clutch 43 that transmits rotational driving force from the drive shaft 41 to the first output shaft 42 or interrupts the rotational driving force, a second output shaft 44 that is rotatably provided coaxially with the drive shaft 41, and an annular second electromagnetic clutch 45 that transmits rotational driving force from the drive shaft 41 to the second output shaft 44 or interrupts the rotational driving force. These drive shaft 41, first output shaft 42, first electromagnetic clutch 43, second output shaft 44 and second electromagnetic clutch 45 are accommodated in the unit housing 22.

The drive shaft 41 includes a shaft body 46 that is coaxial with the rotary shaft 40 of the electric motor 23 and a large-diameter disc-shaped drive hub 47 that projects radially outward from the distal end portion of the shaft body 46. The drive hub 47 is formed to have a relatively thin wall. A disc-shaped first armature 48 is provided on one surface (right side surface shown in FIG. 3) of the drive hub 47. In addition, a disc-shaped second armature 49 is arranged on the other surface (left side surface shown in FIG. 3) of the drive hub 47.

The first output shaft 42 has a substantially cylindrical shape and is rotatably provided coaxially on one side (right side shown in FIG. 3) in the axial direction of the drive shaft 41. A first output hub 50 is formed at the other end portion (left end portion shown in FIG. 3) of the first output shaft 42, and projects radially outward from the cylindrical shaft body to form a large-diameter disc shape. The first output hub 50 is arranged with a small gap from the first armature 48. In addition, a first electromagnetic coil 52 of the first electromagnetic clutch 43 is externally fitted around the outer periphery of the first output shaft 42 at a position adjacent to the first output hub 50. The first output hub 50 is placed between the drive hub 47 (first armature 48) and the first electromagnetic coil 52.

The first electromagnetic clutch 43 includes the first armature 48, the first output hub 50, and the first electromagnetic coil 52. The outer periphery of the first electromagnetic clutch 43 is fixed to the housing 22. The first output shaft 42 is supported by a first rolling bearing 51. The outer ring of the first rolling bearing 51 is internally fixedly fitted to the inner periphery of the first electromagnetic clutch 43. In addition, the inner ring of the first rolling bearing 51 is externally fixedly fitted around the outer periphery of the first output shaft 42.

As direct-current voltage is applied to the first electromagnetic coil 52 of the first electromagnetic clutch 43, the first electromagnetic clutch 43 enters an operating state, and the first armature 48 is attracted to the first electromagnetic coil 52 to cause the first armature 48 provided for the drive hub 47 to be brought into contact with and coupled to the other surface (left surface shown in FIG. 3) of the first output hub 50. By so doing, the rotational driving force (running torque) of the drive hub 47 (drive shaft 41) is transmitted to the first output shaft 42. Then, as supply of direct-current voltage to the first electromagnetic coil 52 is interrupted, coupling between the first armature 48 and the first output hub 50 is released to interrupt transmission of the rotational driving force (torque transmission) to the first output shaft 42.

The second output shaft 44 is rotatably provided coaxially with the first output shaft 42 on the opposite side of the drive hub 47 with respect to the first output shaft 42. That is, the first and second output shafts 42 and 44 are arranged so as to place the drive hub 47 in between. The second output shaft 44 forms a substantially annular shape, and surrounds the drive shaft 41. A second output hub 53 is formed at the other end portion (right end portion shown in FIG. 3) of the second output shaft 44, and projects radially outward from the annular shaft body to form a large-diameter disc shape. The second output hub 53 is arranged with a small gap from the second armature 49. In addition, a second electromagnetic coil 55 of the second electromagnetic clutch 45 is externally fitted around the outer periphery of the second output shaft 44 at a position adjacent to the second output hub 53. In other words, the second output hub 53 is placed between the drive hub 47 (second armature 49) and the second electromagnetic coil 55.

The second electromagnetic clutch 45 includes the second armature 49, the second output hub 53 and the second electromagnetic coil 55. The outer periphery of the second electromagnetic clutch 45 is fixed to the housing 22. The second output shaft 44 is supported by a second rolling bearing 54. The outer ring of the second rolling bearing 54 is internally fixedly fitted to the inner periphery of the second electromagnetic clutch 45. In addition, the inner ring of the second rolling bearing 54 is externally fixedly fitted around the outer periphery of the second output shaft 44.

As direct-current voltage is applied to the second electromagnetic coil 55 of the second electromagnetic clutch 45, the second electromagnetic clutch 45 enters an operating state, and the second armature 49 is attracted to the second electromagnetic coil 55 to cause the second armature 49 provided for the drive hub 47 to be brought into contact with and coupled to one surface (right surface shown in FIG. 3) of the second output hub 53. By so doing, the rotational driving force (running torque) of the drive hub 47 (drive shaft 41) is transmitted to the second output shaft 44. Then, as supply of direct-current voltage to the second electromagnetic coil 55 is interrupted, coupling between the second armature 49 and the second output hub 53 is released to interrupt transmission of the rotational driving force (torque transmission) to the second output shaft 44.

During operation of the first electromagnetic clutch 43, the other surface of the large-diameter first output hub 50 is in plane contact with the first armature 48, and, during operation of the second electromagnetic clutch 45, one surface of the large-diameter second output hub 53 is in plane contact with the second armature 49, so it is possible to keep the high transmission efficiency of torque transmission from the drive shaft 41 to the first output shaft 42, and, in addition, it is possible to keep the high transmission efficiency of torque transmission from the drive shaft 41 to the second output shaft 44.

In addition, the drive hub 47 is formed to have a relatively thin wall, so the distance between the first output shaft 42 and the second output shaft 44 does not excessively increase. Therefore, the axial length of the changing unit 26 may be kept short. Note that a brake mechanism is provided for an electromagnetic clutch mechanism that includes the first electromagnetic clutch 43 and the second electromagnetic clutch 45. Specifically, even in a state where the second electromagnetic clutch 45 is in a non-operating state, that is, a state where the rotary shaft 40 and the second output shaft 44 are released, the second output shaft 44 is fixedly held by the electromagnetic clutch mechanism.

A relatively small-diameter annular first gear (transmission mechanism) 56 is externally fixedly fitted around the outer periphery of the second output shaft 44 so as to be adjacent to one end side (right side shown in FIG. 3) of the second rolling bearing 54. The first gear 56 is provided coaxially with the second output shaft 44. The first gear 56 is supported by a third rolling bearing 57. The outer ring of the third rolling bearing 57 is internally fixedly fitted to the inner periphery of the first gear 56. The inner ring of the third rolling bearing 57 is externally fixedly fitted around the outer periphery of the drive shaft 41.

In this embodiment, the drive shaft 41, the first and second output shafts 42 and 44, the first gear 56, the first to third rolling bearings 51, 54 and 57 and the first and second electromagnetic clutches 43 and 45 are unitized. Therefore, at the time of assembling the transmission 1, it is possible to simply assemble these members 41 to 45, 51, 54, 56 and 57 to the housing 22. Then, at the time of assembling the changing unit 26 into the housing 22, as the changing unit 26 is entered into the accommodating space 30 through the opening of the housing 22, one end of the changing unit 26 engages with the step 31 and is assembled at a predetermined accommodating position. By so doing, it is possible to simply assemble the changing unit 26 into the housing 22.

The first conversion mechanism 24 includes a ball screw mechanism 58 and a connecting rod 60 that connects a nut 59 of the ball screw mechanism 58 to the shift select shaft 11. The ball screw mechanism 58 is coupled to the first output shaft 42, and includes a screw shaft 61 that extends coaxially with the first output shaft 42 and the nut 59 that is coupled to the screw shaft 61. The ball screw mechanism 58 converts the rotational motion of the first output shaft 42 to the axial linear motion of the nut 59.

The screw shaft 61 has an external screw thread over all the range except its both end portions. In addition, the inner periphery of the nut 59 has an internal screw thread (not shown). A plurality of balls (not shown) are rollably interposed between the external screw thread of the screw shaft 61 and the internal screw thread of the nut 59. A first end portion 63 (left end portion shown in FIG. 3) of the screw shaft 61 is supported by a fourth rolling bearing 64. The inner ring of the fourth rolling bearing 64 is externally fixedly fitted around the first end portion 63 of the screw shaft 61. In addition, the outer ring of the fourth rolling bearing 64 is internally fitted to a through hole 16 that extends through the inner and outer surfaces of a bottom wall 65 of the unit housing 22. The outer ring of the fourth rolling bearing 64 is in contact with the annular step 66 to be restricted in movement toward one side (left side shown in FIG. 3) in the axial direction. In addition, a lock nut 15 is engaged with the outer ring of the fourth rolling bearing 64 to be restricted in movement toward the other side (right side shown in FIG. 3) in the axial direction. A portion of the first end portion 63 of the screw shaft 61 adjacent to the electric motor 23 (left side shown in FIG. 3) beyond the fourth rolling bearing 64 is inserted in the inner periphery of the first output shaft 42, and is coupled to the first output shaft 42 so as to be integrally rotatable. A second end portion 68 (right end portion shown in FIG. 3) of the screw shaft 61 is supported by a fifth rolling bearing 67. The inner ring of the fifth rolling bearing 67 is externally fixedly fitted around the second end portion 68 of the screw shaft 61. In addition, the outer ring of the fifth rolling bearing 67 is fixed in a cylindrical recess 69 formed at the bottom portion of the housing 22.

The nut 59 has a substantially rectangular parallelepiped shape. A pair of cylindrical columnar shafts 70 (only one is shown in FIG. 3) that extend in a direction parallel to the shift select shaft 11 (direction perpendicular to the sheet surface in FIG. 3, and horizontal direction shown in FIG. 4) are formed to protrude from both side surfaces of the nut 59. The connecting rod 60 includes a first coupling portion 73 that is provided for a first end portion 72 (upper end portion in FIG. 3 and FIG. 4) so as to be coupled to the nut 59 and a second coupling portion 75 (see FIG. 4) that is provided for the second end portion 74 (lower end portion in FIG. 3 and FIG. 4) of the connecting rod 60 so as to be coupled to the shift select shaft 11.

The first coupling portion 73 is, for example, a metal bracket, includes a pair of support plate portions 76 and a connection bar 77 (see FIG. 4) that connects the respective proximal end portions (upper end portions in FIG. 3 and FIG. 4) of the support plate portions 76, and forms a laid U shape (shape in which U shape is laid by 90 degrees) in side view. Each of the support plate portions 76 has a U-shaped groove 78 that is cut out from its distal end side (upper end portion in FIG. 3 and FIG. 4) and that extends in the axial direction, and each of the support plate portions 76 has a bifurcated fork shape that extends from the proximal end portion toward the distal end portion. The shafts 70 are respectively engaged with the U-shaped grooves 78. The groove width of each U-shaped groove 78 is set to a size that matches with the diameter of the shaft 70, and is a substantially uniform size along the axial direction of the connecting rod 60.

The shafts 70 are respectively engaged with the U-shaped grooves 78, so the nut 59 is provided so as to be relatively rotatable about the shafts 70 with respect to the connecting rod 60. In addition, the shafts 70 are engaged with the U-shaped grooves 78, so, even when the distance between the shafts 70 and the connecting rod 60 varies, it is possible to keep the engaged state between the shafts 70 and the U-shaped grooves 78. Therefore, even when the nut 59 moves in the axial direction and the distance between the nut 59 and the shift select shaft 11 varies, it is possible to keep the engaged state between the shafts 70 and the U-shaped grooves 78.

The second coupling portion 75 has a cylindrical shape, and is externally fitted around the shift select shaft 11. A spline groove 79 (see FIG. 4) that is spline-fitted to the spline portion 37 formed on the peripheral surface of the shift select shaft 11 is formed at the second coupling portion 75. Therefore, the second coupling portion 75 is coupled to the shift select shaft 11 relatively non-rotatably in a state where relative axial movement is allowed. Therefore, the connecting rod 60 is provided so as to be oscillatable about the central axis C1 of the shift select shaft 11. As the nut 59 moves along its axial direction (horizontal direction in FIG. 3, and direction perpendicular to the sheet surface shown in FIG. 4) with the rotation of the screw shaft 61, the connecting rod 60 oscillates about the central axis C1 of the shift select shaft 11 as shown in FIG. 3.

The second conversion mechanism 25 includes the first gear (transmission mechanism) 56, a transmission shaft (transmission mechanism) 95 that extends parallel to the drive shaft 41 and that is rotatably provided, a second gear (transmission mechanism) 81 that is coaxially fixed to the transmission shaft 95 at a predetermined position adjacent to the first end portion 80 (left end portion shown in FIG. 3) and a small-diameter pinion 36 that is coaxially fixed to the transmission shaft 95 at a predetermined position adjacent to the second end portion 82 (right end portion shown in FIG. 3). The first gear 56 and the second gear 81 each are formed of a spur gear. Note that the second gear 81 is formed to be larger in diameter than both the first gear 56 and the pinion 36. That is, the second conversion mechanism 25 constitutes a reduction gear.

The first end portion 80 (left end portion shown in FIG. 3) of the transmission shaft 95 is supported by a sixth rolling bearing 96. The inner ring of the sixth rolling bearing 96 is externally fixedly fitted around the first end portion 80 (left end portion shown in FIG. 3) of the transmission shaft 95. In addition, the outer ring of the sixth rolling bearing 96 is fixed in a cylindrical recess 83 that is formed on the inner surface (right surface shown in FIG. 3) of the lid 27. In addition, the second end portion 82 (right end portion shown in FIG. 3) of the transmission shaft 95 is supported by a seventh rolling bearing 84. The inner ring of the seventh rolling bearing 84 is externally fixedly fitted around the second end portion 82 of the transmission shaft 95. In addition, the outer ring of the seventh rolling bearing 84 is fixed in a cylindrical recess 86 that is formed around a sensor hole 85 (described below) at the bottom portion of the housing 22.

The rotation amount of the transmission shaft 95 is detected by a first rotation amount sensor 87. The sensor hole 85 is formed in the bottom wall of the housing 22, and extends through the inner and outer surfaces of the bottom wall. The first rotation amount sensor 87 is arranged near the bottom portion of the housing 22 outside the housing 22, and the distal end portion of a first sensor shaft 99 extending from a sensor portion (not shown) is coupled to the second end portion 82 of the transmission shaft 95 via the sensor hole 85 so as to be integrally rotatable. The rotation amount of the shift select shaft 11 is detected through the rotation of the first sensor shaft 99 resulting from the rotation of the shift select shaft 11. A value detected by the first rotation amount sensor 87 is input to an ECU 88 (described later).

In addition, a second rotation amount sensor 89 for detecting the rotation amount of the shift select shaft 11 is provided in the housing 22. The second rotation amount sensor 89 includes a body 90 in which a sensor portion (not shown) is incorporated, a second sensor shaft 94 that is coupled to the sensor portion, and a sector gear 91 that is externally fixedly fitted around the second sensor shaft 94. The sector gear 91 is in mesh with a sensor gear 92 that is externally fixedly fitted around the shift select shaft 11. The rotation amount of the shift select shaft 11 is detected through the rotation of the second sensor shaft 94 resulting from the rotation of the shift select shaft 11. A value detected by the second rotation amount sensor 89 is input to the ECU 88 described below.

As a shift knob 93 of the vehicle is operated, a signal from an operation detection sensor of the shift knob 93 is given to the ECU 88 (electronic control unit). The ECU 88 executes drive control over the electric motor 23 via the motor driver (not shown). In addition, the ECU 88 executes drive control over the first and second electromagnetic clutches 43 and 45 via a relay circuit (not shown).

In the shift/select actuating device 21, as the electric motor 23 is driven for rotation, the drive shaft 41 rotates. At this time, when the first and second electromagnetic clutches 43 and 45 are in a non-operating state, the drive shaft 41 rotates at idle, so the rotational driving force of the electric motor 23 is not given to the first output shaft 42 or the second output shaft 44. Then, as the first electromagnetic clutch 43 is operated and the rotational driving force from the electric motor 23 is given to the first output shaft 42, the screw shaft 61 rotates with the rotation of the first output shaft 42, and the nut 59 coupled to the screw shaft 61 moves in the axial direction. Then, with the axial movement of the nut 59, the connecting rod 60 oscillates about the central axis C1 of the shift select shaft 11. The second coupling portion 75 of the connecting rod 60 is provided so as to be relatively non-rotatable with respect to the shift select shaft 11, so the shift select shaft 11 rotates with the oscillation of the connecting rod 60.

In addition, in a state where the electric motor 23 is driven for rotation, as the second electromagnetic clutch 45 is operated and the rotational driving force from the electric motor 23 is given to the second output shaft 44, the rotational driving force of the second output shaft 44 is given to the pinion 36 via the first gear 56, the second gear 81 and the transmission shaft 95. Then, owing to the meshing between the rack teeth 35 and the pinion 36, the shift select shaft 11 moves in the axial direction with the rotation of the pinion 36. In other words, the rotational driving force of the pinion 36 is converted to the moving force of the shift select shaft 11 in the axial direction.

That is, in an operating state of the first electromagnetic clutch 43, the shift select shaft 11 is driven for rotation, and, in an operating state of the second electromagnetic clutch 45, the shift select shaft 11 moves in its axial direction. Thus, by selectively operating the first electromagnetic clutch 43 or the second electromagnetic clutch 45, it is possible to separately perform shift operation and select operation. By so doing, it is possible to perform shift operation and select operation using the driving force of the single electric motor 23.

In addition, in this embodiment, the second output shaft 44 is formed in an annular shape, and the second output shaft is arranged so as to surround the drive shaft 41, so it is possible to keep the axial length of the changing unit 26 short. By so doing, it is possible to reduce the size of the shift/select actuating device 21, and it is possible to reduce the overall size of the transmission 1. Furthermore, the ball screw mechanism 58 is used to convert the rotational driving force of the first output shaft 42 into linear motion, so it is possible to further reduce the size of the shift/select actuating device 21.

Figure 5:
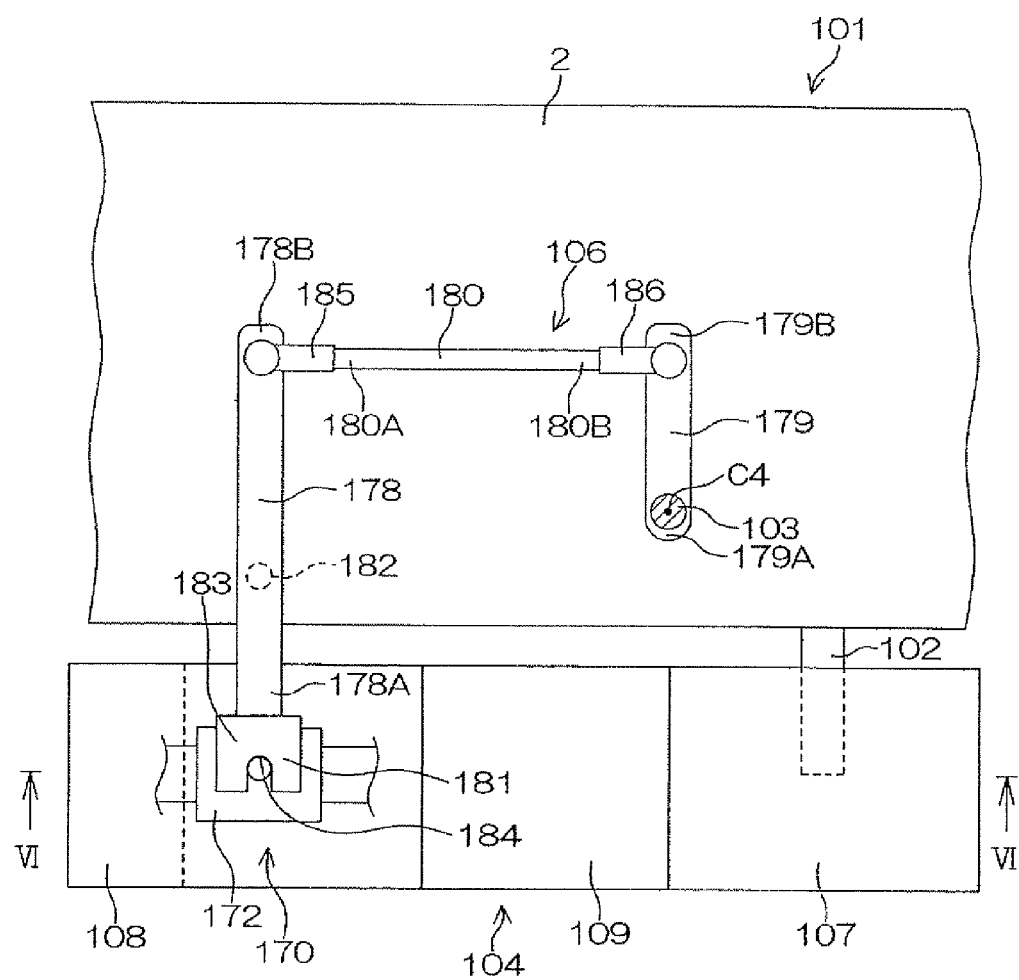
FIG. 5 is a view that shows the schematic configuration of a transmission according to a second embodiment of the invention.

FIG. 5 is a view that shows the schematic configuration of a transmission 101 according to another embodiment (second embodiment) of the invention. In this second embodiment, like reference signs as in the case of FIG. 1 to FIG. 4 denote portions corresponding to the components shown in the above described embodiment (first embodiment) shown in FIG. 1 to FIG. 4, and the description is omitted. In the transmission 101 according to the second embodiment, instead of the shift select shaft 11 (see FIG. 2 to FIG. 4) for performing shift operation and select operation, a shift shaft 102 for performing shift operation and a select shaft 103 for performing select operation are provided in the gear box 2 (see FIG. 1). The shift shaft 102 and the select shaft 103 extend in directions perpendicular to each other. Shift operation for driving any one of the shift forks 3 to 6 (see FIG. 2) is performed by the rotation of the shift shaft 102 about its axis, and, in addition, select operation for selecting any one of the shift forks 3 to 6, which is a target to be driven, is performed by the movement of the select shaft 103 in the axial direction. One end side portion (lower side portion shown in FIG. 5) of the shift shaft 102 protrudes outward from the gear box 2, and reaches a peripheral region of the housing of a shift/select actuating device 104 described below. In addition, one end side portion (portion adjacent to the front of the sheet surface shown in FIG. 5) of the select shaft 103 protrudes outward from the gear box 2.

The shift/select actuating device 104 for driving shift operation and select operation in the gear box 2 is connected to the peripheral surface (outer surface) of the gear box 2. A second end portion 144B (see FIG. 6A) of a first connecting rod 144 (see FIG. 6A) of the shift/select actuating device 104 is fixed to the shift shaft 102. In addition, a first end portion 179A of a second link arm 179 of a link mechanism 106 is fixed to the select shaft 103. The link mechanism 106 couples the select shaft 103 to a second nut 172 of a second ball screw mechanism 170 (described later), and transmits the rotational driving force of an electric motor 109 (described below) of the shift/select actuating device 104 to the select shaft 103.

The shift/select actuating device 104 includes a first reduction gear unit 107, a second reduction gear unit 108 and the electric motor 109 that is placed between the first reduction gear unit 107 and the second reduction gear unit 108. The shift/select actuating device 104 constitutes an electric actuator unit, and is applied to the transmission 101 as described in this embodiment to function as a shift/select actuating device. The shift/select actuating device 104 has a structure such that the electric motor 109 is placed between the first reduction gear unit 107 and the second reduction gear unit 108, so, when the distance between the shift shaft 102 and the select shaft 103 is relatively narrow, there is a case where the shift shaft 102 cannot be directly coupled to the first reduction gear unit 107 or a case where the select shaft 103 cannot be directly coupled to the second reduction gear unit 108. Therefore, in this embodiment, the link mechanism 106 is used to interlock the select shaft 103 with the second reduction gear unit 108.

Figure 6A:
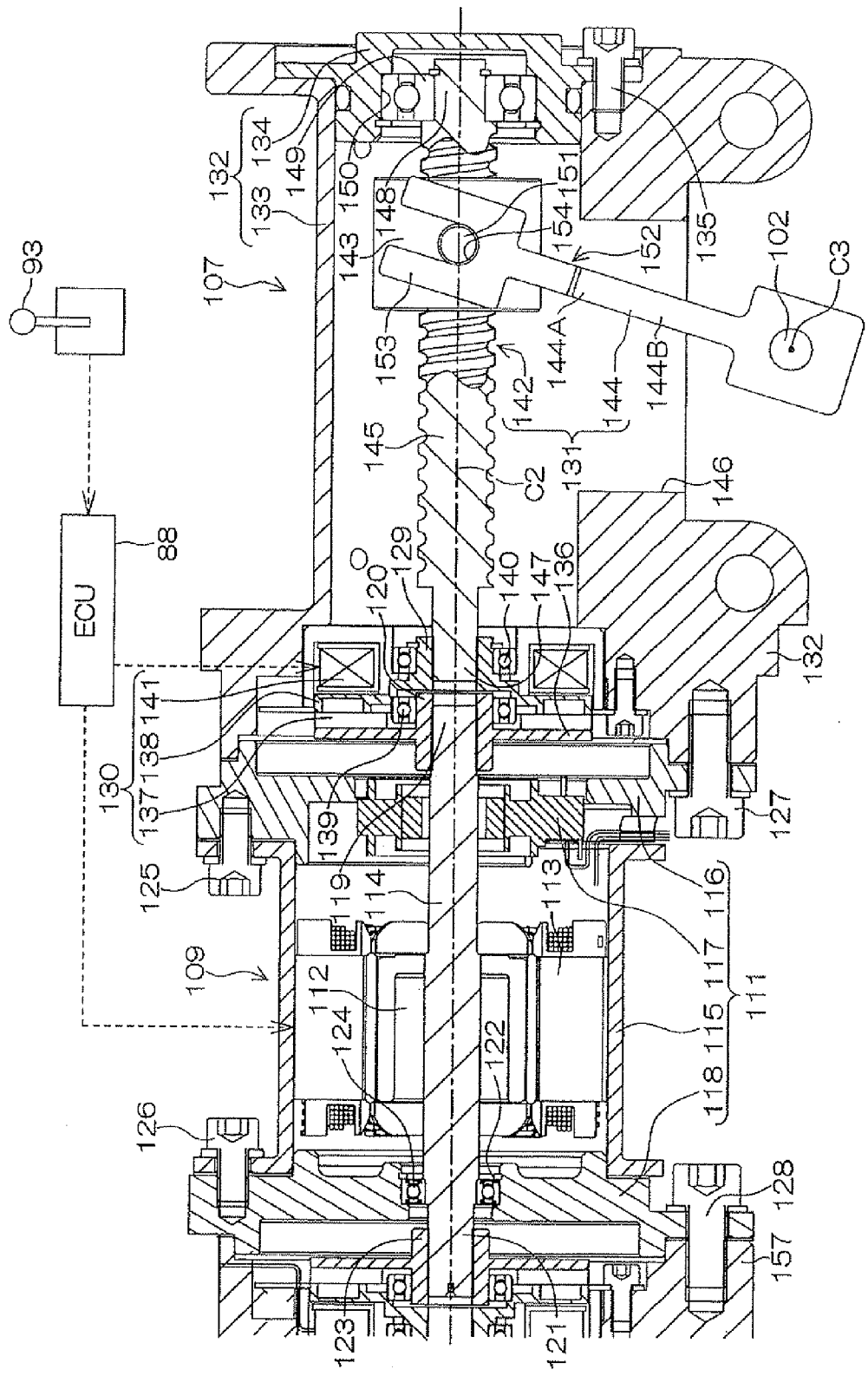
FIG. 6A is a sectional view that is taken along the sectional line VI-VI in FIG. 5 (part 1).
Figure 6B:
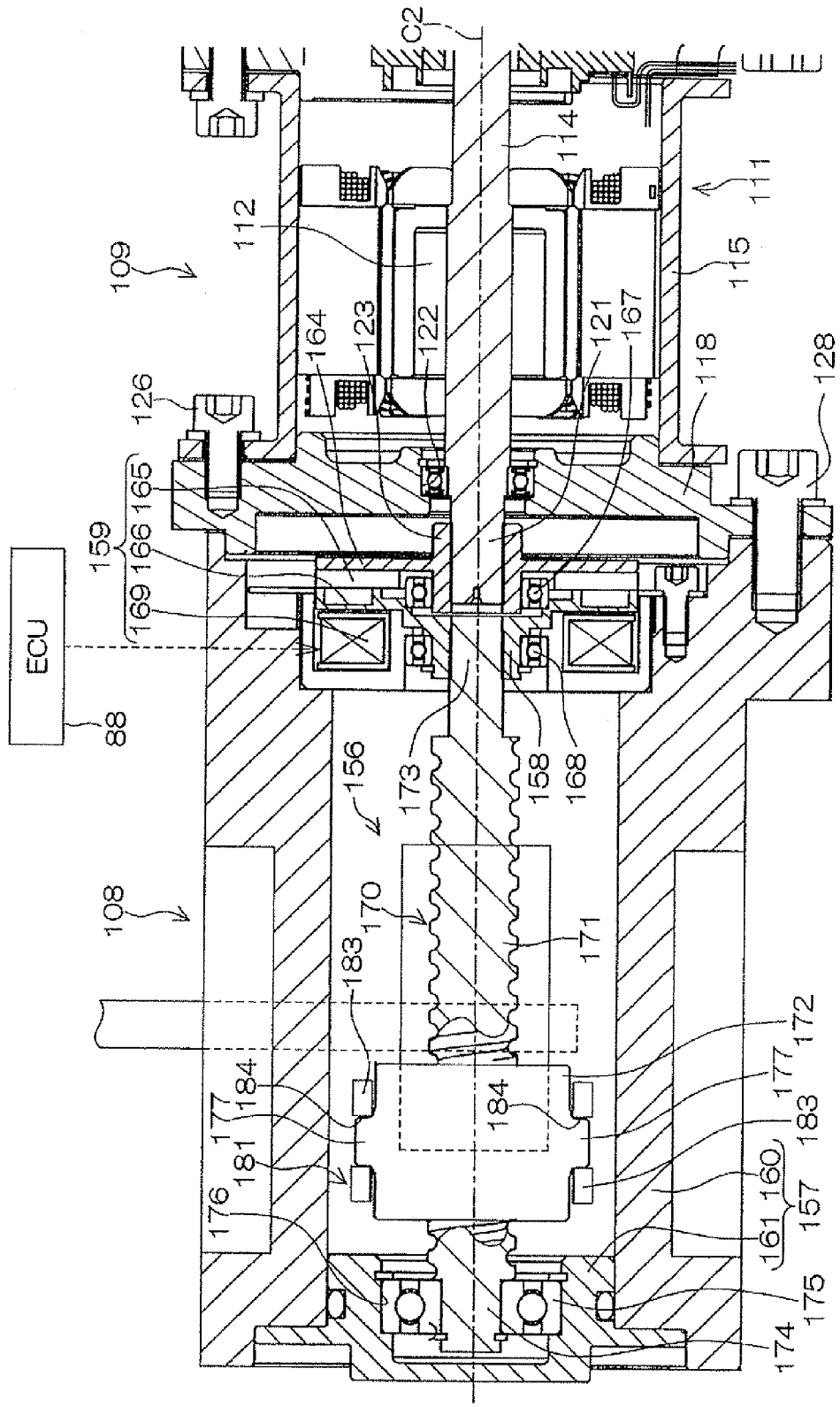
FIG. 6B is a sectional view that is taken along the sectional line VI-VI in FIG. 5 (part 2).

FIG. 6A and FIG. 6B are sectional views that are taken along the sectional line VI-VI in FIG. 5. FIG. 6A shows the sectional configuration of the first reduction gear unit 107 and electric motor 109, and FIG. 6B shows the sectional configuration of the electric motor 109 and second reduction gear unit 108. First, the electric motor 109 will be described. A brushless motor is employed as the electric motor 109. The electric motor 109 includes a motor housing 111 and a rotor 112 and a stator 113 that are accommodated in the motor housing 111. The rotor 112 has an annular shape, and a plurality of permanent magnets are held on its outer peripheral portion. The outer periphery of the rotor 112 serves as magnetic poles of which a north pole and a south pole are alternately changed. A rotary shaft 114 is coaxially fixed to the rotor 112. The rotor 112 and the rotary shaft 114 are rotatable together (C2 in FIG. 6A and FIG. 6B is the rotation axis of the rotary shaft 114).

The motor housing 111 includes a cylindrical bracket 115 that surrounds the outer periphery of the stator 113, a substantially annular first cover bracket 116 and a substantially disc-shaped partition wall 117 that close one end portion (right end portion shown in FIG. 6A and FIG. 6B) of the cylindrical bracket 115, and a second cover bracket 118 that closes the other end portion (left end portion shown in FIG. 6A and FIG. 6B) of the cylindrical bracket 115. The partition wall 117 partitions a space, in which the rotor 112 and the stator 113 are accommodated, from a side adjacent to the first reduction gear unit 107. A first end portion 119 (right end portion shown in FIG. 6A) of the rotary shaft 114 protrudes from the partition wall 117 (motor housing 111), and is fixedly inserted through the inner periphery of a cylindrical first drive shaft 120 (described later) of the first reduction gear unit 107. In addition, a second end portion 121 (left end portion shown in FIG. 6A and FIG. 6B) of the rotary shaft 114 is inserted through an insertion hole 122 formed in the second cover bracket 118, and protrudes from the second cover bracket 118. The second end portion 121 of the rotary shaft 114 is fixedly inserted through the inner periphery of a cylindrical second drive shaft 123 (described later) of the second reduction gear unit 108. That is, the rotary shaft 114 extends through the motor housing 111.

The rotor 112 and the rotary shaft 114 are rotatably supported by an eighth rolling bearing 124. The inner ring of the eighth rolling bearing 124 is externally fixedly fitted around the outer periphery of the second end portion 121 of the rotary shaft 114. In addition, the outer ring of the eighth rolling bearing 124 is internally fitted to the inner periphery of the insertion hole 122. The cylindrical bracket 115 is fixed to the first cover bracket 116 by a bolt 125, and is fixed to the second cover bracket 118 by a bolt 126.

In addition, the first cover bracket 116 is fixed to a first unit housing 132 of the first reduction gear unit 107 by a bolt 127, and the second cover bracket 118 is fixed to a second unit housing 157 of the second reduction gear unit 108 by a bolt 128. By so doing, fixing the motor housing 111 to the first unit housing 132 and the second unit housing 157 is achieved.

The first reduction gear unit 107 includes the first drive shaft 120 that is coupled to the first end portion 119 (right end portion shown in FIG. 6A) of the rotary shaft 114 of the electric motor 109 so as to be integrally rotatable, a cylindrical first output shaft 129 that is rotatably arranged coaxially on the opposite side (right side shown in FIG. 6A) of the first drive shaft 120 with respect to the electric motor 109, an annular first electromagnetic clutch 130 that transmits or interrupts the rotational driving force from the first drive shaft 120 to the first output shaft 129, and a third conversion mechanism 131 for amplifying the rotational driving force given from the electric motor 109 to the first output shaft 129 and converting the amplified rotational driving force to force that rotates the shift shaft 102 about its axis. These first drive shaft 120, first output shaft 129, first electromagnetic clutch 130 and third conversion mechanism 131 are accommodated in the first unit housing 132.

The first unit housing 132 includes a substantially cylindrical first cylindrical portion 133 and a first lid 134 that closes one end portion (right end portion shown in FIG. 6A) of the first cylindrical portion 133. The first lid 134 is fixed to the first cylindrical portion 133 by a bolt 135. A first passing hole 146 is formed at the center portion of the first cylindrical portion 133 in the axial direction for allowing a first connecting rod (connecting rod) 144 of a first ball screw mechanism (ball screw mechanism) 142 (described later) to pass therethrough.

The first drive shaft 120 has a substantially cylindrical shape, and extends coaxially with the rotary shaft 114 of the electric motor 109. The rotary shaft 114 of the electric motor 109 is fixedly inserted to the substantially cylindrical inner periphery of the first drive shaft 120. A large-diameter disc-shaped first drive hub 136 is provided at the center portion of the first drive shaft 120 in the axial direction. A first armature 137 is arranged at the peripheral edge portion on one side (right side shown in FIG. 6A) surface of the first drive hub 136.

The first output shaft 129 is rotatably provided coaxially on one side (right side shown in FIG. 6A) in the axial direction of the first drive shaft 120. A first output hub 138 that projects radially outward and that has a large-diameter disc shape is formed at one end portion (right end portion shown in FIG.

6A) of the first output shaft 129. The first output hub 138 is arranged with a small gap from the first armature 137. In addition, a first electromagnetic coil 141 of the first electromagnetic clutch 130 is externally fitted around the outer periphery of the first output shaft 129 at a position adjacent to the first output hub 138. In other words, the first output hub 138 is placed between the first drive hub 136 (first armature 137) and the first electromagnetic coil 141. The first electromagnetic clutch 130 includes the first armature 137, the first output hub 138 and the first electromagnetic coil 141. The outer periphery of the first electromagnetic clutch 130 is fixed to the first unit housing 132. The first output shaft 129 is supported by a ninth rolling bearing 139 and a tenth rolling bearing 140.

The outer ring of the ninth rolling bearing 139 is internally fixedly slatted to a step that is formed on the inner side surface of the first output shaft 129. The inner ring of the ninth rolling bearing 139 is externally fixedly fitted around the outer periphery of the first drive shaft 120. The outer ring of the tenth rolling bearing 140 is internally fixedly fitted to the inner periphery of the first electromagnetic dutch 130. In addition, the inner ring of the tenth rolling bearing 140 is externally fixedly fitted around the outer periphery of the first output shaft 129.

As direct-current voltage is applied to the first electromagnetic coil 141 of the first electromagnetic clutch 130, the first electromagnetic clutch 130 enters an operating state, and the first armature 137 is attracted to the first electromagnetic coil 141 to cause the first armature 137 provided for the first drive hub 136 to be coupled to the first output hub 138. By so doing, torque of the first drive hub 136 (first drive shaft 120) is transmitted to the first output shaft 129. Then, as supply of direct-current voltage to the first electromagnetic coil 141 is interrupted, coupling between the first armature 137 and the first output hub 138 is released to interrupt torque transmission from the first drive hub 136 (first drive shaft 120) to the first output shaft 129.

The third conversion mechanism 131 includes the first ball screw mechanism 142 and the first connecting rod 144 that couples a first nut (nut) 143 of the first ball screw mechanism 142 to the shift shaft 102. The first ball screw mechanism 142 is coupled to the first output shaft 129 so as to be integrally rotatable, and includes a first screw shaft (screw shaft) 145 that extends coaxially with the first output shaft 129 and the first nut 143 that is coupled to the first screw shaft 145. The first ball screw mechanism 142 converts the rotational motion of the first output shaft 129 to the axial linear motion of the first nut 143.

The first screw shaft 145 has an external screw thread over all the range except its both end portions. In addition, the inner periphery of the first nut 143 has an internal screw thread (not shown). A plurality of balls (not shown) are rollably interposed between the external screw thread of the first screw shaft 145 and the internal screw thread of the first nut 143. A first end portion 147 (left end portion shown in FIG. 6A) of the first screw shaft 145 is inserted into the inner periphery of the first output shaft 129, and is coupled to the first output shaft 129 so as to be integrally rotatable. A second end portion 148 (right end portion shown in FIG. 6A) of the first screw shaft 145 is supported by an eleventh rolling bearing 149. The inner ring of the eleventh rolling bearing 149 is externally fixedly fitted around the second end portion 148 of the first screw shaft 145. In addition, the outer ring of the eleventh rolling bearing 149 is fixed in a cylindrical recess 150 that is formed on the inner surface (right surface shown in FIG. 6A) of the first lid 134.

The first nut 143 has a substantially rectangular parallelepiped shape. A pair of cylindrical columnar shafts 151 (only one is shown in FIG. 6A) that extend in a direction parallel to the shift shaft 102 (direction perpendicular to the sheet surface in FIG. 6A) are formed to protrude from both side surfaces of the first nut 143. A first coupling portion 152 that is provided for a first end portion 144A (upper end portion in FIG. 6A) of the first connecting rod 144 so as to be coupled to the first nut 143. In addition, a second end portion 144B (lower end portion in FIG. 3 and FIG. 4) of the first connecting rod 144 are fixed to the shift shaft 102 (provided so as to be relatively non-rotatable).

The coupling portion 152 has a similar structure to the first coupling portion 73 of the connecting rod 60 shown in FIG. 3 and FIG. 4, and includes a pair of support plate portions 153 (only one is shown in FIG. 6A) and a connection bar (not shown) that connects the respective proximal end portions (upper end portions in FIG. 6A) of the support plate portions 153. The coupling portion 152 forms a laid U shape (shape in which U shape is laid by 90 degrees) in side view. Each of the support plate portions 153 has a U-shaped groove 154 that is cut out from its distal end side (upper end portion in FIG. 6A) and that extends in the axial direction, and each of the support plate portions 153 has a bifurcated fork shape that extends from the proximal end portion toward the distal end portion. The shafts 151 are respectively engaged with the U-shaped grooves 154. The groove width of each U-shaped groove 154 is set to a size that matches with the diameter of the shaft 151, and is a substantially uniform size along the axial direction of the first connecting rod 144.

The shafts 151 are respectively engaged with the U-shaped grooves 154, so the first nut 143 is provided so as to be relatively rotatable about the shafts 151 with respect to the first connecting rod 144. In addition, the shafts 151 are engaged with the U-shaped grooves 154, so, even when the distance between the shafts 151 and the first connecting rod 144 varies, it is possible to keep the engaged state between the shafts 151 and the U-shaped grooves 154. Therefore, even when the first nut 143 moves in the axial direction and the distance between the first nut 143 and the shift shaft 102 varies, it is possible to keep the engaged state between the shafts 151 and the U-shaped grooves 154.

On the other hand, the second reduction gear unit 108 includes the second drive shaft 123 that is fixed to the second end portion 121 (left end portion shown in FIG. 6B) of the rotary shaft 114 of the electric motor 109, a second output shaft 158 that is rotatably arranged coaxially on the opposite side (left side shown in FIG. 6B) of the second drive shaft 123 with respect to the electric motor 109, an annular second electromagnetic clutch 159 that transmits rotational driving force from the second drive shaft 123 to the second output shaft 158 or interrupts the rotational driving force, and a fourth conversion mechanism 156 for amplifying the rotational driving force given from the electric motor 109 to the second output shaft 158 and converting the amplified rotational driving force to force that rotates the shift shaft 102 about its axis. These second drive shaft 123, second output shaft 158, second electromagnetic clutch 159 and fourth conversion mechanism 156 are accommodated in the second unit housing 157.

The second unit housing 157 includes a substantially cylindrical second cylindrical portion 160 and a second lid 161 that closes the other end portion (left end portion shown in FIG. 6A and FIG. 6B) of the second cylindrical portion 160. The second lid 161 is fixed to the second cylindrical portion 160. A second passing hole 163 is formed at the center portion of the second cylindrical portion 160 in the axial direction for allowing a first link arm 178 of the link mechanism 106 to pass therethrough. The second passing hole (not shown) is formed at a position that intersects at 90 degrees with the first passing hole 135 when viewed along the extended line of the rotary shaft 114.

The second drive shaft 123 has a substantially cylindrical shape, and extends coaxially with the rotary shaft 114 of the electric motor 109. The rotary shaft 114 of the electric motor 109 is fixedly inserted in the substantially cylindrical inner periphery of the second drive shaft 123. A large-diameter disc-shaped second drive hub 164 is provided at the center portion of the second drive shaft 123 in the axial direction. A second armature 165 is arranged at the peripheral edge portion on the other side (left side shown in FIG. 6B) surface of the second drive hub 164.

The second output shaft 158 is rotatably provided coaxially on the other side (left side shown in FIG. 6B) of the second drive shaft 123. A second output hub 166 that projects radially outward and that has a large-diameter disc shape is formed at one end portion (left end portion shown in FIG. 6B) of the second output shaft 158. The second output hub 166 is arranged with a small gap from the second armature 165. In addition, a second electromagnetic coil 169 of the second electromagnetic clutch 159 is externally fitted around the outer periphery of the second output shaft 158 at a position adjacent to the second output hub 166. In other words, the second output hub 166 is placed between the second drive hub 164 (second armature 165) and the second electromagnetic coil 169 of the second electromagnetic clutch 159. The second electromagnetic clutch 159 includes the second armature 165, the second output hub 166 and the second electromagnetic coil 169. The outer periphery of the second electromagnetic clutch 159 is fixed to the second unit housing 157. The second output shaft 158 is supported by a twelfth rolling bearing 167 and a thirteenth rolling bearing 168. The outer ring of the twelfth rolling bearing 167 is internally fixedly fitted to a step that is formed on the inner side surface of the second output shaft 158. The inner ring of the twelfth rolling bearing 167 is externally fixedly fitted around the outer periphery of the second drive shaft 123. The outer ring of the thirteenth rolling bearing 168 is internally fixedly fitted to the inner periphery of the second electromagnetic clutch 159. In addition, the inner ring of the thirteenth rolling bearing 168 is externally fixedly fitted around the outer periphery of the second output shaft 158.

As direct-current voltage is applied to the second electromagnetic coil 169 of the second electromagnetic clutch 159, the second electromagnetic clutch 159 enters an operating state, and the second armature 165 is attracted to the second electromagnetic coil 169 to cause the second armature 165 provided for the second drive hub 164 to be coupled to the second output hub 166. By so doing, torque of the second drive hub 164 (second drive shaft 123) is transmitted to the second output shaft 158. Then, as supply of direct-current voltage to the second electromagnetic coil 169 is interrupted, coupling between the second armature 165 and the second output hub 166 is released to interrupt torque transmission from the second drive hub 164 (second drive shaft 123) to the second output shaft 158.

The fourth conversion mechanism 156 includes the second ball screw mechanism 170. The second ball screw mechanism 170 is coupled to the second output shaft 158, and includes a second screw shaft 171 that extends coaxially with the second output shaft 158 and a second nut 172 that is coupled to the second screw shaft 171. The second ball screw mechanism 170 converts the rotational motion of the second output shaft 158 to the axial linear motion of the second nut 172.

The second screw shaft 171 has an external screw thread over all the range except its both end portions. In addition, the inner periphery of the second nut 172 has an internal screw thread (not shown). A plurality of balls (not shown) are rollably interposed between the external screw thread of the second screw shaft 171 and the internal screw thread of the second nut 172. A first end portion 173 (right end portion shown in FIG. 6B) of the second screw shaft 171 is inserted into the inner periphery of the second output shaft 158, and is coupled to the second output shaft 158 so as to be integrally rotatable. A second end portion 174 (left end portion shown in FIG. 6B) of the second screw shaft 171 is supported by a fourteenth rolling bearing 175. The inner ring of the fourteenth rolling bearing 175 is externally fixedly fitted around the second end portion 174 (left end portion shown in FIG. 6B) of the second screw shaft 171. In addition, the outer ring of the fourteenth rolling bearing 175 is fixed in a cylindrical recess 176 that is formed on the inner surface (left surface shown in FIG. 6A) of the second lid 161.

The second nut 172 has a substantially rectangular parallelepiped shape. A pair of cylindrical columnar shafts 177 that extend in a direction parallel to the shift shaft 102 (vertical direction in FIG. 6B) are formed to protrude from both side surfaces of the second nut 172. The first link arm 178 (see FIG. 5) of the link mechanism 106 (see FIG. 5) is coupled to the second nut 172 of the second ball screw mechanism 170.

Referring in addition to FIG. 5, the link mechanism 106 includes the first link arm 178 that has a first end portion 178A and a second end portion 178B, the second link arm 179 that has the first end portion 179A and a second end portion 179B, and a third link arm 180 that has a first end portion 180A and a second end portion 180B. A coupling portion 181 is provided for the first end portion 178A of the first link arm 178 so as to be coupled to the second nut 172. The coupling portion 181 is engaged with the second nut 172. Then, the first link arm 178 is provided so as to be rotatable about a pivot 182 that is provided on the outer surface of the gear box 2.

The coupling portion 181 has a similar structure to that of the first coupling portion 73 of the connecting rod 60 shown in FIG. 3 and FIG. 4 and that of the coupling portion 152 of the first connecting rod 144 shown in FIG. 6A, and includes a pair of support plate portions 183 and a connection bar (not shown) that connects the respective proximal end portions of the support plate portions 183. The coupling portion 181 forms a laid U shape (shape in which U shape is laid by 90 degrees) in side view. Each of the support plate portions 183 has a U-shaped groove 184 that is cut out from its distal end side and that extends in the axial direction, and each of the support plate portions 183 has a bifurcated fork shape that extends from the proximal end portion toward the distal end portion. The shafts 177 are respectively engaged with the U-shaped grooves 184. The groove width of each U-shaped groove 184 is set to a size that matches with the diameter of the shaft 177, and is a substantially uniform size along the direction in which the first link arm 178 extends.

The shafts 177 are respectively engaged with the U-shaped grooves 184, so the second nut 172 is provided so as to be relatively rotatable about the shafts 177 with respect to the first link arm 178. In addition, the shafts 177 are engaged with the U-shaped grooves 184, so, even when the distance between the shafts 177 and the first link arm 178 varies, it is possible to keep the engaged state between the shafts 177 and the U-shaped grooves 154. Therefore, even when the second nut 172 moves in the axial direction and the distance between the second nut 172 and the second link arm 179 varies, it is possible to keep the engaged state between the shafts 177 and the U-shaped grooves 184.

The first end portion 179A of the second link arm 179 is fixed to the select shaft 103, and the second link arm 179 is provided so as to be oscillatable about the central axis C4 of the select shaft 103. The third link arm 180 couples the second end portion 178B of the first link arm 178 to the second end portion 179B of the second link arm 179. Specifically, the first end portion 180A of the third link arm 180 is coupled to the second end portion 178B of the first link arm 178 via a first ball joint 185, and the second end portion 180B of the third link arm 180 is coupled to the second end portion 179B of the second link arm 179 via a second ball joint 186. Therefore, the third link arm 180 is able to change its position with respect to the first link arm 178 and the second link arm 179. With the oscillation of the first link arm 178 about the pivot 182, the third link arm 180 oscillates about the select shaft 103.

Referring to FIG. 5, FIG. 6A and FIG. 6B, as the electric motor 109 is driven for rotation, the first and second drive shafts 120 and 123 rotate. At this time, when the first and second electromagnetic clutches 130 and 159 are in a non-operating state, the first and second drive shafts 120 and 123 rotate at idle, so the driving force of the electric motor 109 is not given to the first output shaft 129 or the second output shaft 158. Then, as the first electromagnetic clutch 130 is operated and the rotational driving force from the electric motor 109 is given to the first output shaft 129, the first screw shaft 145 rotates with the rotation of the first output shaft 129, and the first nut 143 coupled to the first screw shaft 145 moves in the axial direction. Then, with the axial movement of the first nut 143, the first connecting rod 144 oscillates about the central axis C3 of the shift shaft 102. The second end portion 144B of the first connecting rod 144 is fixed to the shift shaft 102, so the shift shaft 102 rotates with the oscillation of the first connecting rod 144.

In addition, as the second electromagnetic clutch 159 is operated and the rotational driving force from the electric motor 109 is given to the second output shaft 158, the second screw shaft 171 rotates with the rotation of the second output shaft 158, and the second nut 172 coupled to the second screw shaft 171 moves in the axial direction. Then, with the movement of the second nut 172, the first link arm 178 of the link mechanism 106 oscillates about the pivot 182, and, accordingly, the third link arm 180 oscillates about the central axis C4 of the select shaft 103. The first end portion 180A of the third link arm 180 is fixed to the select shaft 103, so the select shaft 103 rotates with the oscillation of the third link arm 180.

That is, the shift shaft 102 is driven for rotation in an operating state of the first electromagnetic clutch 130, and the select shaft 103 is driven for rotation in an operating state of the second electromagnetic clutch 159. Thus, by selectively operating the first electromagnetic clutch 130 or the second electromagnetic clutch 159, it is possible to separately perform shift operation and select operation. By so doing, it is possible to perform shift operation and select operation using the driving force of the single electric motor 109.

In addition, the rotary shaft 114 is configured to extend through the motor housing 111, the first drive shaft 120 is coupled to the first end portion 119 of the rotary shaft 114 so as to be integrally rotatable, and the second drive shaft 123 is coupled to the second end portion 121 of the rotary shaft 114 so as to be integrally rotatable. Then, the first output shaft 129 is arranged on the opposite side of the first drive shaft 120 with respect to the electric motor 109, and the first drive shaft 120 is coupled to the first output shaft 129 via the first electromagnetic clutch 130. In addition, the second output shaft 158 is arranged on the opposite side of the second drive shaft 123 with respect to the electric motor, and the second drive shaft 123 is coupled to the second output shaft 158 via the second electromagnetic clutch 19. Therefore, the configuration of the shift/select actuating device 104 may be simplified.

In addition, the first ball screw mechanism 142 is used to convert the rotational driving force of the first output shaft 129 to linear motion, and the second ball screw mechanism 170 is used to convert the rotational driving force of the second output shaft 158 to linear motion, so it is possible to reduce the size of the shift/select actuating device 104, and it is possible to reduce the overall size of the transmission 101. Note that, although not shown in FIG. 6A and FIG. 6B, the shift shaft 102 and/or the select shaft 103 may be provided with a rotation amount sensor for detecting the rotation amount of the shaft 102 or 103. The rotation amount sensor may, for example, detect the displacement of the first nut 143 (second nut 172) in the axial direction and may detect the rotation amount of the shift shaft 102 or the select shaft 103 on the basis of the displacement.

Figure 7A:
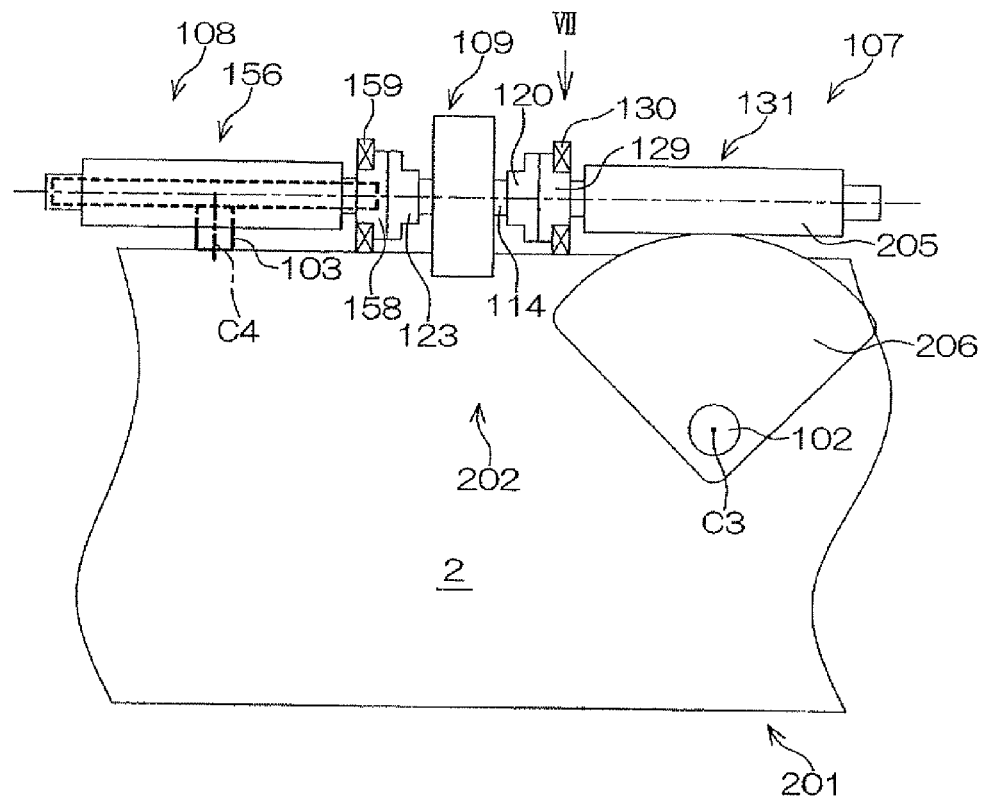
FIG. 7A is a view that shows the configuration of a shift/select actuating device of a transmission according to a third embodiment of the invention.
Figure 7B:
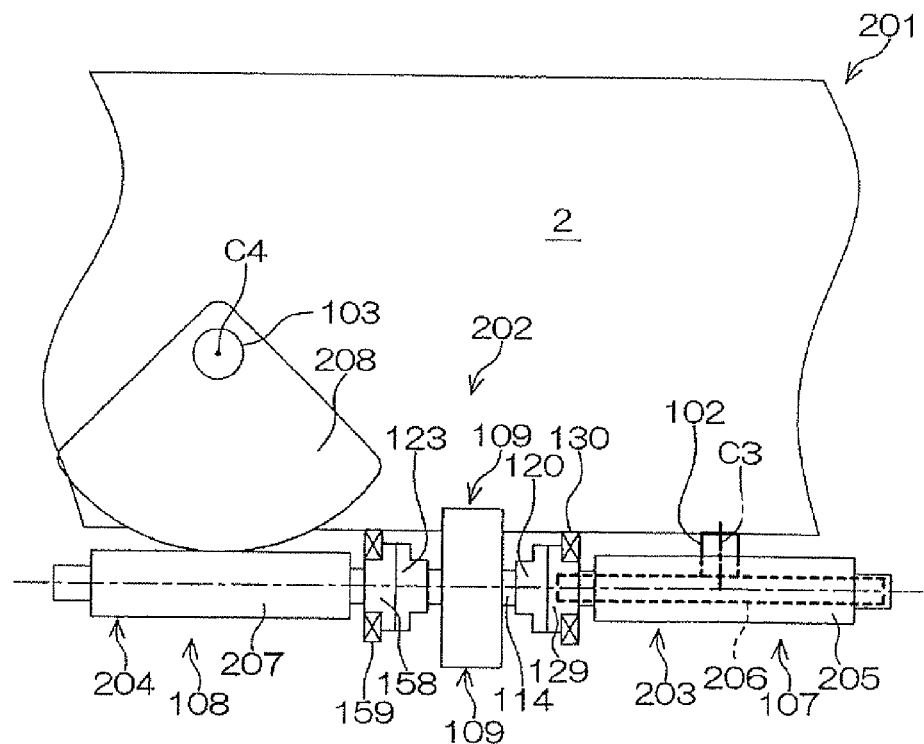
FIG. 7B is a view as seen from the arrow VII in FIG. 7A.

FIG. 7A is a view that shows the configuration of a shift/select actuating device 202 of a transmission 201 according to a third embodiment of the invention. FIG. 7B is a view as seen from the arrow VII in FIG. 7A. In this third embodiment, like reference signs in the case of FIG. 5, FIG. 6A and FIG. 6B denote portions corresponding to the components shown in the above described embodiment (second embodiment) shown in FIG. 5, FIG. 6A and FIG. 6B, and the description is omitted.

In the transmission 201 according to the third embodiment, as in the case of the transmission 101 shown in FIG. 5, FIG. 6A and FIG. 6B, a shift shaft 102 for performing shift operation and a select shaft 103 for performing select operation are provided in a gear box 2 (see FIG. 1). The shift shaft 102 and the select shaft 103 extend in directions perpendicular to each other. A shift/select actuating device 202 for actuating shift operation and select operation in the gear box 2 is mounted on the peripheral surface (outer surface) of the gear box 2. A first worm gear 206 of the shift/select actuating device 202 is fixedly coupled to the shift shaft 102. In addition, a second worm gear 208 of the shift/select actuating device 202 is fixedly coupled to the select shaft 103.

As in the case of FIG. 5, FIG. 6A and FIG. 6B, a rotary shaft 114 of an electric motor 109 extends through a motor housing, and a first end portion (right end portion shown in FIG. 7A and FIG. 7B) and a sixth end portion (left end portion shown in FIG. 7A and FIG. 7B) protrude outward from the motor housing. The shift/select actuating device 202 of the transmission 201 according to the third embodiment differs from the shift/select actuating device 104 according to the second embodiment in that, instead of the third conversion mechanism 131 and the fourth conversion mechanism 156 that include the ball screw mechanisms 142 and 170 and the connecting rod 144, a third conversion mechanism 203 and a fourth conversion mechanism 204 that include worm shafts 205 and 207 and worm gears 206 and 208 that are in mesh with the worm shafts 205 and 207 are provided.

Specifically, the first worm shaft 205 that extends coaxially with the first output shaft 129 is coupled to one end portion (right side portion shown in FIG. 7A and FIG. 7B) of the first output shaft 129. The first worm shaft 205 is in mesh with the first worm gear 206. The first worm gear 206 is coaxially fixed to the shift shaft 102 (and is provided so as to be relatively non-rotatable). The first worm gear 206 is, for example, formed of a sector gear. In addition, the second worm shaft 207 that extends coaxially with the second output shaft 158 is coupled to one end portion (right side portion shown in FIG. 7A and FIG. 7B) of the second output shaft 158. The second worm shaft 207 is in mesh with the second worm gear 208. The second worm gear 208 is coaxially fixed to the select shaft 103 (and is provided so as to be relatively non-rotatable). The second worm gear 208 is, for example, formed of a sector gear.

In a state where the electric motor 109 is driven for rotation, as the first electromagnetic clutch 130 is operated and the rotational driving force from the electric motor 109 is given to the first output shaft 129, the first worm shaft 205 rotates with the rotation of the first output shaft 129. Then, with the rotation of the first worm shaft 205, the first worm gear 206 rotates about the central axis C3 of the shift shaft 102. The first worm gear 206 is coaxially fixed to the shift shaft 102, so the shift shaft 102 rotates with the rotation of the first worm gear 206.

In addition, in a state where the electric motor 109 is driven for rotation, as the second electromagnetic clutch 159 is operated and the rotational driving force from the electric motor 109 is given to the second output shaft 158, the second worm shaft 207 rotates with the rotation of the second output shaft 158. Then, with the rotation of the second worm shaft 207, the second worm gear 208 rotates about the central axis C4 of the select shaft 103. The second worm gear 208 is coaxially fixed to the select shaft 103, so the select shaft 103 rotates with the rotation of the second worm gear 208.

That is, the shift shaft 102 is driven for rotation in an operating state of the first electromagnetic clutch 130, and the select shaft 103 is driven for rotation in an operating state of the second electromagnetic clutch 159. Thus, by selectively operating the first electromagnetic clutch 130 or the second electromagnetic clutch 159, it is possible to separately perform shift operation and select operation. By so doing, it is possible to perform shift operation and select operation using the driving force of the single electric motor 109.

In addition, there is a possibility that the shift shaft 102 and/or the select shaft 103 rotate in an unintended direction because of a reverse input; however, it is locked by the meshing between the first worm shaft 205 and the first worm gear 206 and/or the meshing between the second worm shaft 207 and the second worm gear 208, so it is possible to prevent unintended rotation of the shift shaft 102 and/or the select shaft 103.

Figure 8:
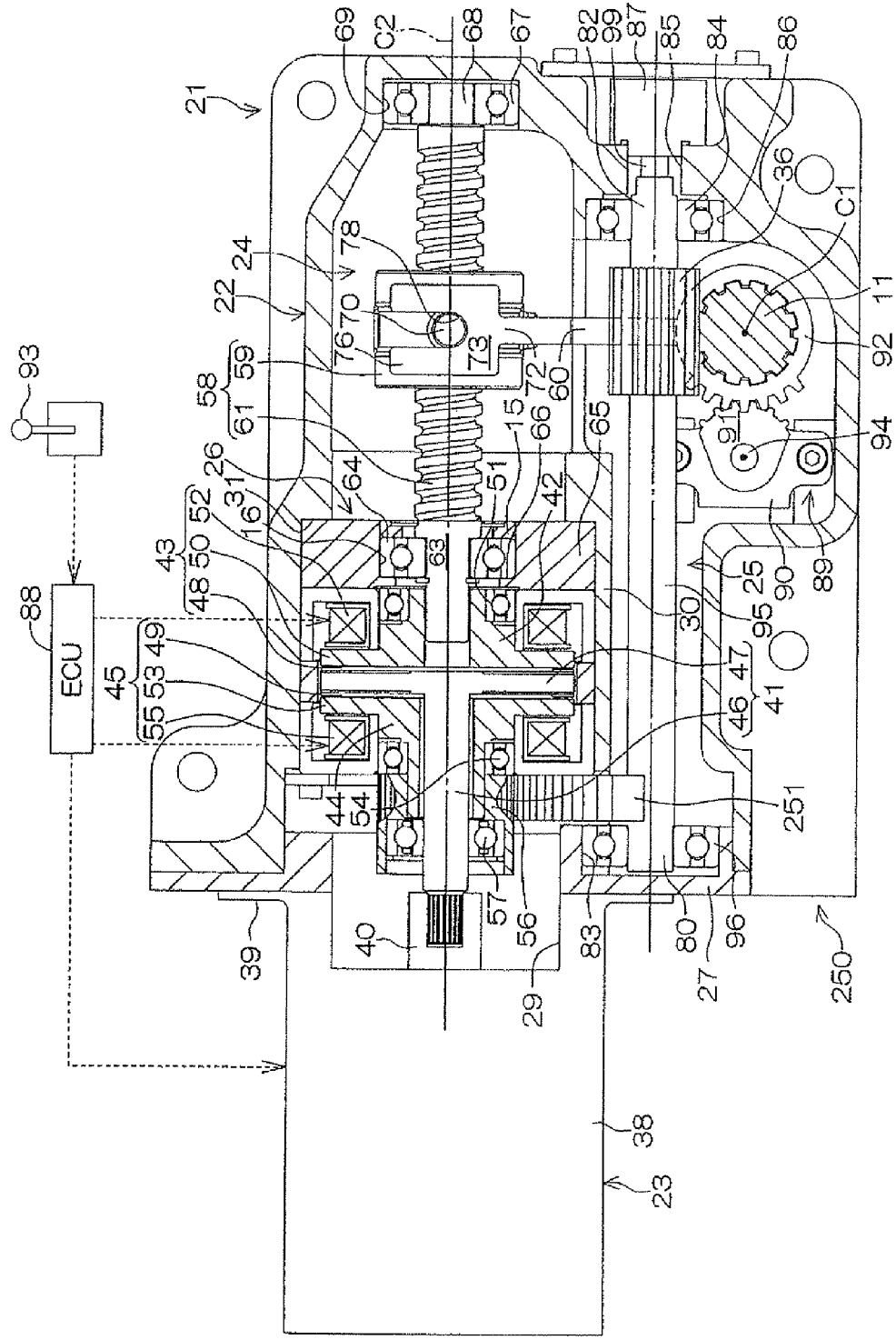
FIG. 8 is a sectional view that shows the configuration of a shift/select actuating device of a transmission according to a fourth embodiment of the invention.
Figure 9:
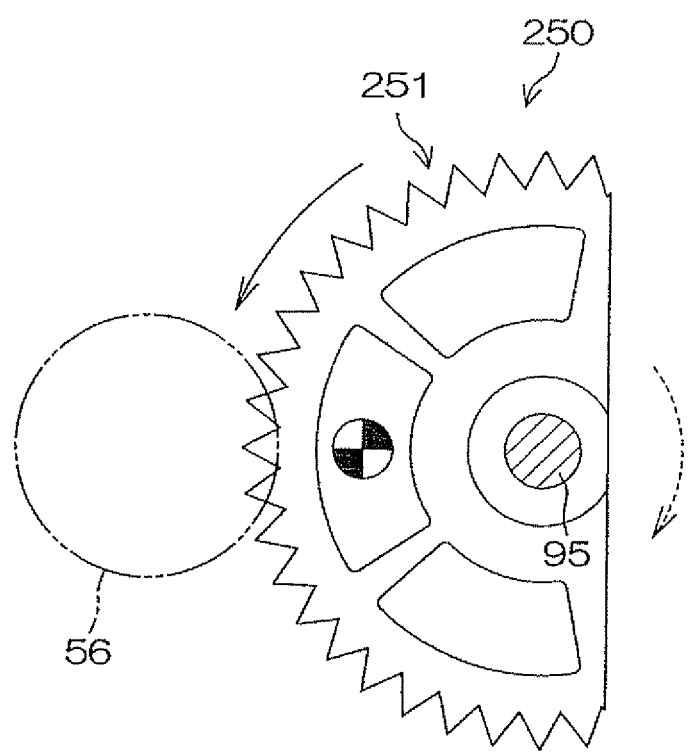
FIG. 9 is a view that shows the configuration of a second gear and its surroundings shown in FIG. 8.

FIG. 8 is a sectional view that shows the configuration of a shift/select actuating device 250 of a transmission according to a fourth embodiment of the invention. FIG. 9 is a view that shows the configuration of a second gear and its surroundings shown in FIG. 8. In FIG. 9, only a shift select shaft 11 and a second gear 251 are shown, and illustration of the other members is omitted (a first gear 56 is shown by the alternate long and two short dashes line). In this fourth embodiment, like reference signs as in the case of the first embodiment denote portions corresponding to the components shown in the embodiment (first embodiment) shown in FIG. 1 to FIG. 4, and the description is omitted. Then, the shift/select actuating device 250 shown in FIG. 8 differs from the shift/select actuating device 21 according to the first embodiment in that, instead of the second gear 81 formed of a spur gear, the second gear (transmission mechanism) 251 formed of a sector gear is provided. The second gear 251 is in mesh with the first gear 56.

In this fourth embodiment, in a state where the transmission is mounted on the vehicle, the shift select shaft 11 extends along the vertical direction (vertical direction, or a direction close to the vertical direction). The transmission shaft 95 extends in a direction perpendicular to the shift select shaft 11, so the transmission shaft 95 extends along the horizontal direction (horizontal direction or a direction close to horizontal). The second gear 251 is connected to the transmission shaft 95 so as to be integrally rotatable. The second gear 251 has a semicircular shape. The second gear 251 has a diameter equivalent to that of the second gear 81. Therefore, the first gear 56 and the second gear 251 constitute part of a reduction gear.

In a state where the transmission is mounted as shown in FIG. 8, force directed downward (downward force) based on the deadweight acts on the shift select shaft 11, and rotational force based on the deadweight of the shift select shaft 11 (hereinafter, referred to as "shift select shaft deadweight rotational force", and is indicated by the dotted line in FIG. 9) acts on the transmission shaft 95. When the second electromagnetic clutch 45 is in an operating state, that is, when the rotary shaft 40 is coupled to the second output shaft 44, the shift select shaft 11 does not come down (moves in the axial direction) by its deadweight. However, in this embodiment, no brake mechanism, or the like, is provided for the second output shaft 44. Therefore, when the second electromagnetic clutch 45 is in a non-operating state, that is, when the rotary shaft 40 is released from the second output shaft 44, the rotary shaft 40 receives the shift select shaft deadweight rotational force to rotate, so there is a possibility that the shift select shaft 11 is allowed to come down. As the shift select shaft 11 rotates, there is a possibility that the axial position (select position) of the shift select shaft 11 varies not through control of the ECU 88.

In this fourth embodiment, the first and second gears 56 and 251 constitute (part of) the reduction gear, and the displacement of the shift select shaft 11 required for select operation is relatively small, so, during select operation, it is sufficient that the second gear 251 performs rotational motion by reciprocating within a set angle. In addition, as shown in FIG. 9, when the second gear 251 is connected to the transmission shaft 95 in a position such that the curved portion (circular arc) of the second gear 251 is directed laterally (toward the first gear 56), the position of the center of gravity of the second gear 251 deviates radially from the rotation axis of the transmission shaft 95, and rotational force based on the deadweight of the second gear 251 (hereinafter, referred to as "second gear deadweight rotational force", and is indicated by the continuous line in FIG. 9) acts on the transmission shaft 95.

In this fourth embodiment, the second gear deadweight rotational force is set to have a direction and size that cancels the shift select shaft deadweight rotational force. Therefore, the shift select shaft deadweight rotational force is cancelled, and the transmission shaft 95 does not rotate. By so doing, it is possible to reliably prevent the shift select shaft 11 from coming down when the rotary shaft 40 is released from the second output shaft 44. By so doing, it is possible to prevent the shift select shaft 11 from coming down without employing an electromagnetic clutch that includes a brake mechanism, or the like, so, by so doing, it is possible to prevent an increase in cost. Note that the size and direction of the second gear deadweight rotational force is set by selecting the number of teeth and/or weight of the second gear 251 and adjusting a position in which the second gear 251 is connected to the transmission shaft 95.

In addition, a sector gear that is lighter and smaller than a spur gear is used as the second gear 251, so it is possible to achieve weight reduction and space saving of the shift/select actuating device 250 as a whole. Note that, in this fourth embodiment, the case where the second gear (sector gear) 251 has a semicircular shape is described by way of example; instead, a sector gear having a fan shape may also be used as the second gear.

As described above, the four embodiments of the invention are described; however, the invention may be implemented in other forms.

For example, in the fourth embodiment, a sector gear may be employed as the first gear. In this case, the second gear may be formed of a spur gear or may be formed of a sector gear. When the first gear formed of a sector gear is connected to the second output shaft 44, the position of the center of gravity of the first gear 1 deviates radially from the rotation axis of the second output shaft 44, rotational force based on the deadweight of the first gear (hereinafter, referred to as "first gear deadweight rotational force") arises in the second output shaft 44, and the first gear deadweight rotational force acts on the transmission shaft 95. Then, when the first gear deadweight rotational force is set to have a direction and size that cancels the shift select shaft deadweight rotational force, the shift select shaft deadweight rotational force is cancelled, and the transmission shaft 95 does not rotate. By so doing, it is possible to reliably prevent the shift select shaft 11 from coming down when the rotary shaft 40 is released from the second output shaft 44.

In addition, in the first embodiment, an urging member (for example, a leaf spring) that elastically presses the sixth rolling bearing 96 along the axial direction (horizontal direction shown in FIG. 3) of the transmission shaft 95 may be interposed between the sixth rolling bearing 96 and the bottom surface of the cylindrical recess 83. Because of pressing in the axial direction of the transmission shaft 95, it is possible to improve the dimensional accuracy in a state where the transmission shaft 95 is mounted.

In addition, in the second embodiment, the link mechanism 106 is used to interlock the select shaft 103 with the second reduction gear unit 108; instead, it may be configured such that the link mechanism 106 is used to interlock the shift shaft 102 with the first reduction gear unit 107. In addition, in the second embodiment, when the select shaft 103 is directly coupled to the second reduction gear unit 108, a second connecting rod of which a first end portion is coupled to the second nut 172 and a second end portion is fixed to the select shaft (coupled so as to be relatively non-rotatable) may be provided. In this case, a coupling portion to be coupled to the second nut 172 is provided for the first end portion of the second connecting rod. The coupling portion has a similar configuration to that of the coupling portion 181 shown in the second embodiment, and engages with the second nut 172.

In addition, the shift/select actuating device 21 of the first embodiment may be used to drive the shift shaft 102 and the select shaft 103 for rotation as shown in the second and third embodiments, and, in addition, the shift/select actuating devices 104 and 202 of the second and third embodiments may be used to rotate and axially move the shift select shaft 11 as shown in the first embodiment. Other than the above, various design changes may be provided within the scope of the matter recited in the claims.

A transmission (1; 101; 201) according to an embodiment of the invention includes: an electric motor (23; 109) that has a rotary shaft (40; 114); a first output shaft (42; 129) that is rotatably provided coaxially with the rotary shaft of the electric motor; a first electromagnetic clutch (43; 130) that transmits rotational driving force from the rotary shaft to the first output shaft or interrupts the rotational driving force; a second output shaft (44; 158) that is rotatably provided coaxially with the rotary shaft; and a second electromagnetic clutch (45; 159) that transmits rotational driving force from the rotary shaft to the second output shaft or interrupts the rotational driving force, wherein the rotational driving force of the electric motor, given to the first output shaft, is used to perform shift operation for driving any one of shift forks (3 to 6), and the rotational driving force of the electric motor, given to the second output shaft, is used to perform select operation for selecting the any one of the shift forks (3 to 6), which is a target to be driven.

With this configuration, as the electric motor is driven, the drive shaft rotates. At this time, when the first and second electromagnetic clutches are in a non-operating state, the rotational driving force of the electric motor is not given to the first output shaft or the second output shaft. Then, as the first electromagnetic clutch is operated, the rotational driving force of the electric motor is given to the first output shaft, and shift operation is performed by the rotational driving force of the first output shaft. In addition, as the second electromagnetic clutch is operated, the rotational driving force from the electric motor is given to the second output shaft, and select operation is performed by the rotational driving force of the second output shaft. Thus, by selectively operating the first or second electromagnetic clutch, it is possible to separately perform shift operation and select operation. By so doing, it is possible to perform shift operation and select operation using the rotational driving force of the single electric motor.

A transmission according to an embodiment of the invention includes: an electric motor (23) that has a rotary shaft (40); a drive shaft (41) that is provided coaxially with the rotary shaft of the electric motor and that is driven for rotation by rotational driving force of the electric motor; a first output shaft (42) that is rotatably provided on a distal end side of the drive shaft coaxially with the drive shaft; a first electromagnetic clutch (43) that transmits rotational driving force from the drive shaft to the first output shaft or interrupts the rotational driving force; a second output shaft (44) that is rotatably provided coaxially with the drive shaft; and a second electromagnetic clutch (45) that transmits rotational driving force from the drive shaft to the second output shaft or interrupts the rotational driving force, wherein the second output shaft has an annular shape and surrounds the drive shaft, the first output shaft is arranged on an opposite side of the drive shaft and the second output shaft with respect to the electric motor, the rotational driving force of the electric motor, given to the first output shaft, is used to perform one of shift operation for driving any one of shift forks (3 to 6) and select operation for selecting the any one of the shift forks (3 to 6), which is a target to be driven, and the rotational driving force of the electric motor, given to the second output shaft, is used to perform the other one of the shift operation and the select operation.

With this configuration, as the electric motor is driven, the drive shaft rotates. At this time, when the first and second electromagnetic clutches are in a non-operating state, the drive shaft rotates at idle, so the driving force of the electric motor is not given to the first output shaft or the second output shaft. Then, as the first electromagnetic clutch is operated, the rotational driving force from the electric motor is given to the first output shaft via the drive shaft, and one of shift operation and select operation is performed by the rotational driving force of the first output shaft. In addition, as the second electromagnetic clutch is operated, the rotational driving force from the electric motor is given to the second output shaft via the drive shaft, and the other one of the shift operation and the select operation is performed by the rotational driving force of the second output shaft. Thus, by selectively operating the first or second electromagnetic clutch, it is possible to separately perform shift operation and select operation. By so doing, it is possible to perform shift operation and select operation using the rotational driving force of the single electric motor.

When two electromagnetic clutches are provided as in the case of the invention of the present application, it is conceivable that the two electromagnetic clutches (the first clutch and the second clutch) are aligned along the axial direction of the rotary shaft of the electric motor. However, in this case, a complex transmission mechanism is required, and there is a possibility that a structure that includes the drive shaft, the first and second output shafts and the first and second electromagnetic clutches becomes complex, and, moreover, the first and second electromagnetic clutches extend along the axial direction of the rotary shaft, so the size of the apparatus may increase.

In contrast to this, in the configuration of the embodiment of the invention, the second output shaft is formed in an annular shape to thereby make it possible to arrange the second output shaft so as to surround the drive shaft. Therefore, it is possible to reduce the axial length required for a combination of the drive shaft, the first output shaft and the second output shaft, and, by so doing, the size of the apparatus may be reduced. In addition, it is desirable that the drive shaft includes a shaft body (46) and a drive hub (47) that projects radially outward from the shaft body and the first and second output shafts are arranged on opposite sides of the drive hub. In this case, the size of the apparatus is reduced, while the transmission efficiency of torque transmission from the drive shaft to the first and second output shafts may be kept high.

In addition, it is desirable that the electric motor, the drive shaft, the first and second output shafts and the first and second electromagnetic clutches are unitized. In this case, at the time of assembling the transmission, the drive shaft, the first and second output shafts and the first and second electromagnetic clutches may be simply assembled to the housing (22). A transmission (101; 201) according to an embodiment of the invention includes: a motor housing (111); an electric motor (109) that has a rotary shaft (114) that extends through the motor housing; a first drive shaft (120) that is coupled to one end side of the rotary shaft so as to be integrally rotatable with the rotary shaft; a first output shaft (129) that is rotatably provided on an opposite side Of the first drive shaft with respect to the electric motor coaxially with the first drive shaft; a first electromagnetic clutch (130) that transmits rotational driving force from the first drive shaft to the first output shaft or interrupts the rotational driving force; a second drive shaft (123) that is coupled to the other end side, which is opposite to the one end, of the rotary shaft so as to be integrally rotatable with the rotary shaft; a second output shaft (158) that is rotatably provided on an opposite side of the second drive shaft with respect to the electric motor coaxially with the second drive shaft; and a second electromagnetic clutch (159) that transmits rotational driving force from the second drive shaft to the second output shaft or interrupts the rotational driving force, wherein the rotational driving force of the electric motor, given to the first output shaft, is used to perform shift operation for driving any one of shift forks (3 to 6), and the rotational driving force of the electric motor, given to the second output shaft, is used to perform select operation for selecting the any one of the shift forks (3 to 6), which is a target to be driven.

With this configuration, as the electric motor is driven, the first and second drive shafts rotate. At this time, when the first and second electromagnetic clutches are in a non-operating state, the first and second drive shafts rotate at idle, so the driving force of the electric motor is not given to the first output shaft or the second output shaft. Then, as the first electromagnetic clutch is operated, the rotational driving force from the electric motor is given to the first output shaft via the first drive shaft, and shift operation is performed by the rotational driving force of the first output shaft. In addition, as the second electromagnetic clutch is operated, the rotational driving force from the electric motor is given to the second output shaft via the second drive shaft, and select operation is performed by the rotational driving force of the second output shaft. Thus, by selectively operating the first or second electromagnetic clutch, it is possible to separately perform shift operation and select operation. By so doing, it is possible to perform shift operation and select operation using the rotational driving force of the single electric motor.

In addition, when two electromagnetic clutches are provided as in the case of the invention of the present application, it is conceivable that the drive shaft is coupled to the distal end portion of the rotary shaft so as to be integrally rotatable, then the first electromagnetic clutch for transmitting or interrupting rotational driving force is interposed between the drive shaft and the first output shaft, and the second electromagnetic clutch for transmitting or interrupting rotational driving force is interposed between the first output shaft and the second output shaft. However, in this case, a complex transmission mechanism is required, and a structure that includes the drive shaft, the first and second output shafts and the first and second electromagnetic clutches may become complex.

In contrast to this, in the invention of the embodiment of the invention, the rotary shaft extends through the motor housing. In addition, the first output shaft is arranged on the opposite side of the first drive shaft with respect to the electric motor, and the first drive shaft is coupled to the first output shaft via the first electromagnetic clutch. In addition, the second output shaft is arranged on the opposite side of the second drive shaft with respect to the electric motor, and the second drive shaft is coupled to the second output shaft via the second electromagnetic clutch. Therefore, it is possible to simplify the configuration of the transmission.

The invention according to the embodiment of the invention includes: a shift select shaft (11) that is moved in an axial direction to perform the select operation, that is rotated about its axis to perform the shift operation and that extends in a direction perpendicular to the rotary shaft; a first conversion mechanism (24) for converting rotational driving force given to the first output shaft to force that rotates the shift select shaft about its axis; and a second conversion mechanism (25) for converting rotational driving force given to the second output shaft to force that axially moves the shift select shaft.

By so doing, the rotational driving force given from the electric motor to the first output shaft is converted to the rotational driving force of the shift select shaft via the first conversion mechanism. Therefore, the rotational driving force given from the electric motor to the second output shaft is converted to moving force of the shift select shaft in the axial direction via the second conversion mechanism. That is, the shift select shaft is driven for rotation in an operating state of the first electromagnetic clutch, and the shift select shaft moves in the axial direction in an operating state of the second electromagnetic clutch. By so doing, it is possible to drive the shift select shaft for rotation and axially move the shift select shaft using the driving force of the single electric motor.

The first conversion mechanism may include: a ball screw mechanism (58) that has a screw shaft (61) to which the rotational driving force from the first output shaft is given and a nut (59) that is coupled to the screw shaft; and a connecting rod (60) that has a first end portion (72) and a second end portion (74), the first end portion being coupled to the nut, the second end portion being coupled to the shift select shaft so as to be relatively non-rotatable with respect to the shift select shaft, and that is oscillatable about the shift select shaft.

In addition, the first conversion mechanism may include: a worm shaft to which the rotational driving force from the first output shaft is given; and a worm gear that is in mesh with the worm shaft and that gives the rotational driving force of the worm shaft to the shift select shaft. The second conversion mechanism may include: a pinion (36) that is rotatable about a predetermined rotation axis parallel to the second output shaft; a transmission mechanism (56, 81, 251 and 95) that transmits the rotational driving force from the second output shaft to the pinion; and rack teeth (35) that are formed on a peripheral surface of the shift select shaft and that are in mesh with the pinion.

In addition, the second conversion mechanism may include: a first gear (56) that receives the rotational driving force from the second output shaft to rotate; a transmission shaft (95) that extends parallel to the second output shaft; a second gear (251) that is provided for the transmission shaft so as to be integrally rotatable and that is in mesh with the first gear; a pinion (36) that is provided for the transmission shaft so as to be integrally rotatable; and rack teeth (35) that are formed on a peripheral surface of the shift select shaft and that are in mesh with the pinion, wherein at least one of the first and second gears may be formed of a sector gear.

With this configuration, when the shift select shaft extends along the vertical direction because of a state where the transmission is mounted on a vehicle, or the like, (mounted condition), force directed downward (downward force) based on the deadweight of the shift select shaft acts on the shift select shaft, and rotational force based on the deadweight of the shift select shaft (hereinafter, referred to as "shift select shaft deadweight rotational force") acts on the transmission shaft as a result of receiving the downward force.

When the rotary shaft is coupled to the second output shaft by the second electromagnetic clutch, the shift select does not receive its deadweight to come down (move in the axial direction). However, when no brake mechanism, or the like, is provided in association with the second output shaft, in a state where the rotary shaft is released from the second output shaft, the rotary shaft receives the shift select shaft deadweight rotational force to rotate, and, therefore, there is a possibility that the shift select shaft is allowed to come down. As the shift select shaft comes down, there is a possibility that the axial position (select position) of the shift select shaft varies not through control of a control unit.

Thus, when no brake mechanism, or the like, is provided in association with the second output shaft, the shift select shaft cannot be placed in a position so as to extend along the vertical direction. Therefore, there have been restrictions on a state where the apparatus is mounted on a vehicle, or the like (mounted condition). Then, when at least one of the first and second gears is formed of a sector gear, the sector gear may have a fan shape or a semicircular shape.

The case where a sector gear is used as the second gear and a gear of another type (for example, spur gear) is used as the first gear is considered. When the first and second gears constitute (part of) a reduction gear, the rotation amount of the second gear is relatively small. In addition to this, when the displacement of the shift select shaft required for select operation is relatively small, it is sufficient that the second gear performs rotational motion by reciprocating within a set angle. Thus, in such a case, even when a sector gear is used as the second gear, no problem occurs in terms of operation.

The transmission shaft extends in a direction perpendicular to the shift select shaft, so, when the shift select shaft extends along the vertical direction, the transmission shaft extends along the horizontal direction (horizontal direction or a direction close to the horizontal direction). The second gear has a fan shape or a semicircular shape. Therefore, depending on a position in which the second gear is mounted on the transmission shaft, the position of the center of gravity of the mounted second gear deviates radially from the rotation axis of the transmission shaft, and rotational force based on the deadweight of the second gear (hereinafter, referred to as "second gear deadweight rotational force") acts on the transmission shaft. At this time, when the second gear deadweight rotational force is set to have a direction and size that cancel the shift select shaft deadweight rotational force of the shift select shaft that extends along the vertical direction by selecting the number of teeth and/or weight of the second gear or/and adjusting the position in which the second gear is mounted on the transmission shaft, the shift select shaft deadweight rotational force is cancelled, and the transmission shaft does not rotate. By so doing, it is possible to prevent the shift select shaft from coming down when the rotary shaft is released from the second output shaft. Thus, it is possible to prevent the shift select shaft from coming down without employing an electromagnetic clutch that includes a brake mechanism, or the like, so, by so doing, it is possible to prevent an increase in cost.

Next, the case where a sector gear is used as the first gear is considered. In this case, the second gear may be formed of a sector gear or may be formed of a gear of another type (for example, spur gear). The second output shaft extends in a direction perpendicular to the shift select shaft, so, when the shift select shaft extends along the vertical direction, the second output shaft extends along the horizontal direction (horizontal direction or a direction close to the horizontal direction). The first gear has a fan shape or a semicircular shape. Therefore, depending on a position in which the first gear is mounted on the second output shaft, the position of the center of gravity of the mounted first gear deviates radially from the rotation axis of the transmission shaft, and rotational force based on the deadweight of the first gear (hereinafter, referred to as "first gear deadweight rotational force") arises. Then, the first gear deadweight rotational force acts on the transmission shaft that supports the second gear meshing the first gear so as to be integrally rotatable. At this time, when the first gear deadweight rotational force is set to have a direction and size that cancel the shift select shaft deadweight rotational force of the shift select shaft that extends along the vertical direction by selecting the number of teeth and/or weight of the first gear or/and adjusting the position in which the first gear is mounted on the transmission shaft, the shift select shaft deadweight rotational force is cancelled, and the transmission shaft does not rotate. By so doing, it is possible to prevent the shift select shaft from coming down when the rotary shaft is released from the second output shaft. Thus, it is possible to prevent the shift select shaft from coming down without employing an electromagnetic clutch that includes a brake mechanism, or the like, so, by so doing, it is possible to prevent an increase in cost.

In addition, a sector gear that is lighter and smaller than a spur gear is used as at least one of the first gear and the second gear, so it is possible to achieve weight reduction and space saving of the transmission as a whole. The transmission according to the embodiment of the invention includes: a select shaft (103) that extends in a direction perpendicular to the rotary shaft and that rotates about its axis to perform the select operation; a shift shaft (102) that extends in a direction perpendicular to both the rotary shaft and the select shaft and that rotates about its axis to perform the shift operation; a third conversion mechanism (131; 203) for converting the rotational driving force given to the first output shaft to force that rotates the shift shaft about its axis; and a fourth conversion mechanism (156; 204) for converting the rotational driving force given to the second output shaft to force that rotates the select shaft about its axis.

With this configuration, the rotational driving force given from the electric motor to the first output shaft is converted to the rotational driving force of the shift shaft via the third conversion mechanism. Therefore, the rotational driving force given from the electric motor to the second output shaft is converted to moving force of the select shaft in the axial direction via the fourth conversion mechanism. That is, the shift shaft is driven for rotation in an operating state of the first electromagnetic clutch, and the select shaft is driven for rotation in an operating state of the second electromagnetic clutch. By so doing, it is possible to drive the shift shaft for rotation and drive the select shaft for rotation using the driving force of the single electric motor.

In addition, the third conversion mechanism may include: a ball screw mechanism (first ball screw mechanism) (142) that has a screw shaft (first screw shaft) (145) to which rotational driving force from the first output shaft is given and a nut (first nut) (143) that is coupled to the screw shaft; and a connecting rod (first connecting rod) (144) that has a first end portion (144A) and a second end portion (144B), the first end portion being coupled to the nut, the second end portion being coupled to the shift shaft so as to be relatively non-rotatable with respect to the shift shaft, and that is oscillatable about a rotation axis of the shift shaft.

Furthermore, the fourth conversion mechanism may include: a second ball screw mechanism that has a second screw shaft to which rotational driving force from the second output shaft is given and a second nut that is coupled to the second screw shaft; and a second connecting rod that is coupled to a select coupling shaft of which one end portion is coupled to the second nut and the other end portion is coupled to the select shaft so as to be relatively non-rotatable with respect to the select shaft and that is oscillatable about a rotation axis of the select shaft.

In addition, the third conversion mechanism may include a first worm shaft (205) to which rotational driving force from the first output shaft is given and a first worm gear (206) that is in mesh with the first worm shaft and that gives the rotational driving force of the first worm shaft to the shift shaft, and the fourth conversion mechanism may include a second worm shaft (207) to which rotational driving force from the second output shaft is given and a second worm gear (208) that is in mesh with the second worm shaft and that gives the rotational driving force of the second worm shaft to the select shaft.

DESCRIPTION OF REFERENCE NUMERALS 3 to 6 shift fork
11 shift select shaft
22 housing
23 electric motor
24 first conversion mechanism
25 second conversion mechanism
35 rack teeth
36 pinion
40 rotary shaft
41 drive shaft
42 first output shaft
43 first electromagnetic clutch
44 second output shaft
45 second electromagnetic clutch
46 shaft body
56 first gear (transmission mechanism)
58 ball screw mechanism
59 nut
60 connecting rod
61 screw shaft
72 first end portion
74 second end portion
81 second gear (transmission mechanism)
95 transmission shaft (transmission mechanism)
102 shift shaft
103 select shaft
109 electric motor
111 motor housing
114 rotary shaft
120 first drive shaft
123 second drive shaft
129 first output shaft
130 first electromagnetic clutch
131, 203 third conversion mechanism
142 first ball screw mechanism (ball screw mechanism)
143 first nut (nut)
144 first connecting rod (connecting rod)
144A first end portion
144B second end portion
145 first screw shaft (screw shaft)
156, 204 fourth conversion mechanism
158 second output shaft
159 second electromagnetic clutch
205 first worm shaft
206 first worm gear
207 second worm shaft
208 second worm gear
251 second gear (transmission mechanism)

The invention claimed is:

1. A transmission comprising:
an electric motor that has a rotary shaft;
a first output shaft that is rotatably provided coaxially with the rotary shaft of the electric motor;
a first electromagnetic clutch that transmits rotational driving force from the rotary shaft to the first output shaft or interrupts the rotational driving force;
a second output shaft that is rotatably provided coaxially with the rotary shaft; and
a second electromagnetic clutch that transmits rotational driving force from the rotary shaft to the second output shaft or interrupts the rotational driving force, wherein
the rotational driving force of the electric motor, given to the first output shaft, is used to perform shift operation for driving any one of shift forks, and
the rotational driving force of the electric motor, given to the second output shaft, is used to perform select operation for selecting the any one of the shift forks, which is a target to be driven.

2. The transmission according to claim 1, further comprising:
a shift select shaft that moves axially to perform the select operation, that rotates about its axis to perform the shift operation and that extends in a direction perpendicular to the rotary shaft;
a first conversion mechanism for converting rotational driving force given to the first output shaft to force that rotates the shift select shaft about its axis; and
a second conversion mechanism for converting rotational driving force given to the second output shaft to force that axially moves the shift select shaft.

3. The transmission according to claim 2, wherein the first conversion mechanism includes:
a ball screw mechanism that has a screw shaft to which rotational driving force from the first output shaft is given and a nut that is coupled to the screw shaft; and a connecting rod that has a first end portion and a second end portion, the first end portion being coupled to the nut, the second end portion being coupled to the shift select shaft so as to be relatively non-rotatable with respect to the shift select shaft, and that is oscillatable about a rotation axis of the shift select shaft.

4. The transmission according to claim 2, wherein the second conversion mechanism includes:
a pinion that is provided rotatably about a predetermined rotation axis parallel to the second output shaft;
a transmission mechanism that transmits rotational driving force from the second output shaft to the pinion; and
rack teeth that are formed on a peripheral surface of the shift select shaft and that are in mesh with the pinion.

5. The transmission according to claim 2, wherein the second conversion mechanism includes:
a first gear that receives rotational driving force from the second output shaft to rotate;
a transmission shaft that extends parallel to the second output shaft;
a second gear that is provided for the transmission shaft so as to be integrally rotatable and that is in mesh with the first gear;
a pinion that is provided for the transmission shaft so as to be integrally rotatable; and
rack teeth that are formed on a peripheral surface of the shift select shaft and that are in mesh with the pinion, wherein
at least one of the first and second gears is formed of a sector gear.

6. A transmission comprising:
an electric motor that has a rotary shaft;
a drive shaft that is provided coaxially with the rotary shaft of the electric motor and that is driven for rotation by rotational driving force of the electric motor;
a first output shaft that is rotatably provided on a distal end side of the drive shaft coaxially with the drive shaft;
a first electromagnetic clutch that transmits rotational driving force from the drive shaft to the first output shaft or interrupts the rotational driving force;
a second output shaft that is rotatably provided coaxially with the drive shaft; and
a second electromagnetic clutch that transmits rotational driving force from the drive shaft to the second output shaft or interrupts the rotational driving force, wherein
the second output shaft has an annular shape and surrounds the drive shaft,
the first output shaft is arranged on an opposite side of the drive shaft and the second output shaft with respect to the electric motor,
the rotational driving force of the electric motor, given to the first output shaft, is used to perform one of shift operation for driving any one of shift forks and select operation for selecting the any one of the shift forks, which is a target to be driven, and
the rotational driving force of the electric motor, given to the second output shaft, is used to the other one of the shift operation and the select operation.

7. The transmission according to claim 6, wherein the drive shaft includes a shaft body and a drive hub that projects radially outward from the shaft body, and
the first and second output shafts are arranged on opposite sides of the drive hub.

8. The transmission according to claim 6, wherein the electric motor, the drive shaft, the first output shaft, the second output shaft, the first electromagnetic clutch and the second electromagnetic clutch are unitized.

9. A transmission comprising:
an electric motor that has a motor housing and a rotary shaft that extends through the motor housing;
a first drive shaft that is coupled to one end side of the rotary shaft so as to be integrally rotatable with the rotary shaft;
a first output shaft that is rotatably provided on an opposite side of the first drive shaft with respect to the electric motor coaxially with the first drive shaft;
a first electromagnetic clutch that transmits rotational driving force from the first drive shaft to the first output shaft or interrupts the rotational driving force;
a second drive shaft that is coupled to the other end side, which is opposite to the one end, of the rotary shaft so as to be integrally rotatable with the rotary shaft;
a second output shaft that is rotatably provided on an opposite side of the second drive shaft with respect to the electric motor coaxially with the second drive shaft; and
a second electromagnetic clutch that transmits rotational driving force from the second drive shaft to the second output shaft or interrupts the rotational driving force, wherein
the rotational driving force of the electric motor, given to the first output shaft, is used to perform shift operation for driving any one of shift forks, and
the rotational driving force of the electric motor, given to the second output shaft, is used to perform select operation for selecting the any one of the shift forks, which is a target to be driven.

* * * * *